United States Patent
Lee et al.

(10) Patent No.: US 11,442,230 B2
(45) Date of Patent: Sep. 13, 2022

(54) SILICON PHOTONICS COUPLING STRUCTURE USING AN ETCH STOP LAYER AND METHODS OF FORMING THE SAME

(71) Applicant: Taiwan Semiconductor Manufacturing Company Limited, Hsinchu (TW)

(72) Inventors: Yueh Ying Lee, Hsinchu (TW); Chien-Ying Wu, Hsinchu (TW); Sui-Ying Hsu, New Taipei (TW); Chen-Hao Huang, Taoyuan (TW); Chien-Chang Lee, Hsinchu (TW); Chia-Ping Lai, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 43 days.

(21) Appl. No.: 17/097,197

(22) Filed: Nov. 13, 2020

(65) Prior Publication Data
US 2022/0155527 A1   May 19, 2022

(51) Int. Cl.
*G02B 6/34* (2006.01)
(52) U.S. Cl.
CPC ..................... *G02B 6/34* (2013.01)
(58) Field of Classification Search
CPC .......... G02B 6/34; G02B 6/124; G02B 6/305; G02B 6/30
See application file for complete search history.

(56) References Cited

U.S. PATENT DOCUMENTS

| | | | |
|---|---|---|---|
| 9,885,657 B2* | 2/2018 | Rothberg | G01N 21/6428 |
| 10,185,092 B1* | 1/2019 | Bian | G02B 6/305 |
| 10,386,581 B2* | 8/2019 | Chen | G02B 6/124 |
| 10,725,244 B2* | 7/2020 | Paquet | G02B 6/124 |
| 2017/0350818 A1* | 12/2017 | Rothberg | G01N 21/6428 |
| 2018/0284343 A1* | 10/2018 | Melikyan | G02B 6/124 |

* cited by examiner

*Primary Examiner* — Ellen E Kim
(74) *Attorney, Agent, or Firm* — The Marbury Law Group, PLLC

(57) ABSTRACT

An optical structure may be provided by forming a silicon grating structure over a dielectric material layer, depositing at least one dielectric material layer over the silicon grating structure, and depositing at least one dielectric etch stop layer over the at least one dielectric material layer. The at least one dielectric etch stop layer includes at least one dielectric material selected from silicon nitride and silicon oxynitride. A passivation dielectric layer may be formed over the at least one dielectric etch stop layer, and a patterned etch mask layer may be formed over the passivation dielectric layer. An opening may be formed through an unmasked portion of the passivation dielectric layer by performing an anisotropic etch process that etches the dielectric material selective to a silicon nitride or silicon oxynitride using the patterned etch mask layer as a masking structure. The at least one etch mask layer minimizes overetching.

20 Claims, 24 Drawing Sheets

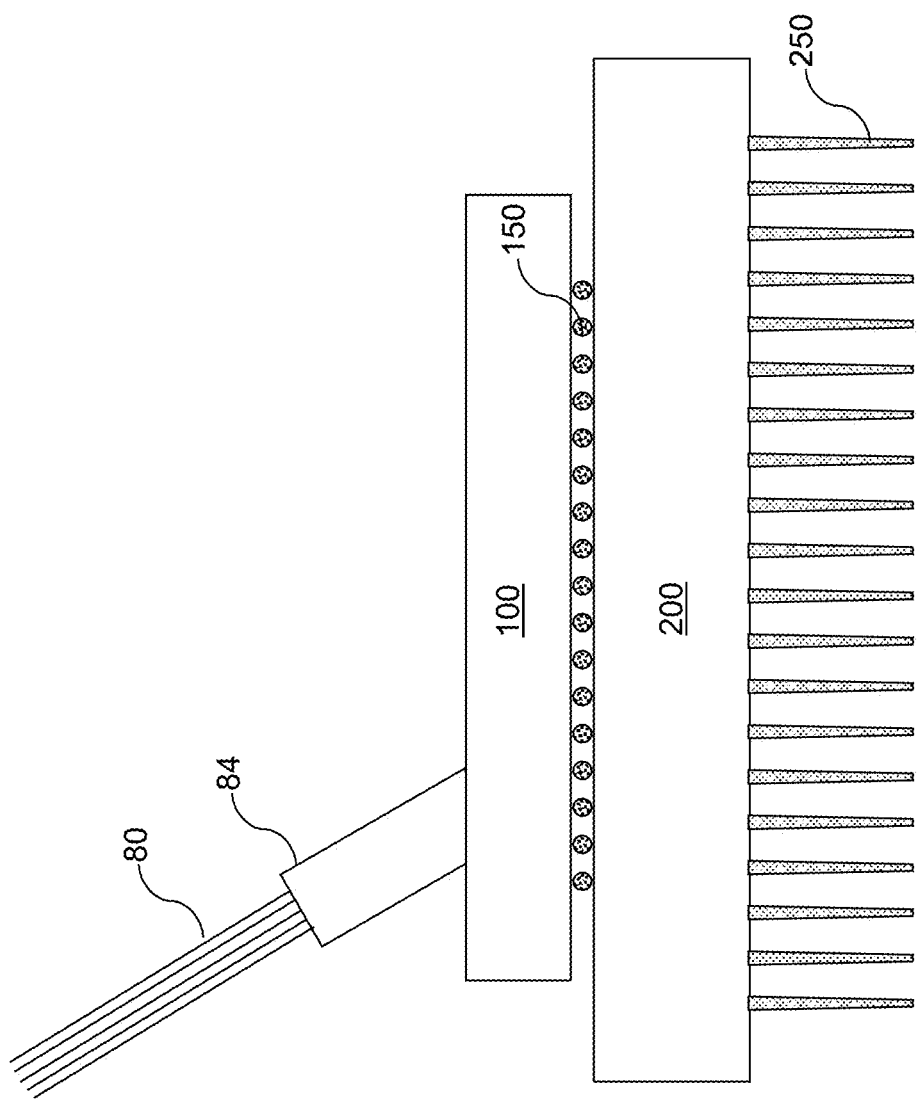

SILICON PHOTONICS COUPLING STRUCTURE USING AN ETCH STOP LAYER AND METHODS OF FORMING THE SAME

BACKGROUND

Silicon photonics coupling is used to provide on-chip optical interconnection between an optical fiber and a photonics device such as a light source or a light sensor. Silicon photonics coupling provides multichannel high performance computing and large capacity data storage servers along while consuming less energy per unit bit as compared to conventional memory devices using flow of electrical current for signal transmission.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a vertical cross-sectional view of an exemplary semiconductor die of the present disclosure after attaching optical fibers according to an embodiment of the present disclosure.

DETAILED DESCRIPTION

Figure 1:
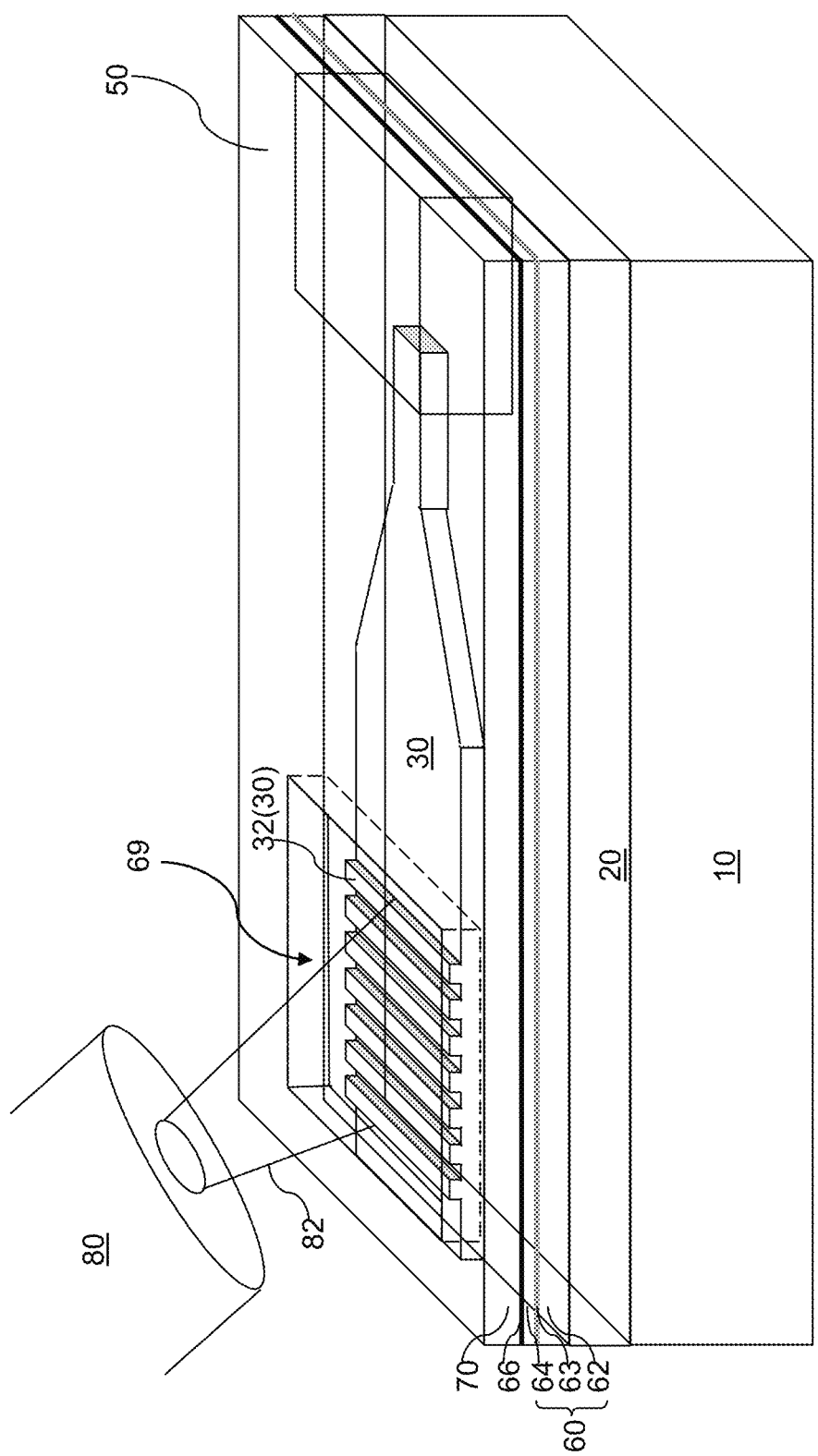
FIG. 1 is a see-through perspective view of an exemplary optical structure according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

The embodiments of the present disclosure is directed to a silicon photonics device including an optical coupling structure for coupling with an optical fiber. In particular, embodiments of the present disclosure are directed to a silicon photonics device including at least one dielectric etch stop layer for controlling a vertical cross-sectional profile of an opening through a passivation dielectric layer over an end portion of a silicon grating structure and methods for forming the same, the various aspects of which are now described in detail.

Various passive and active silicon photonics devices are known in the art. Such silicon photonics devices may generate an optical signal (as in the case of a light source), detect an optical signal (as in the case of a photodetector), or split or amplify an optical signal.

Referring to FIG. 1, an exemplary optical structure according to an embodiment of the present disclosure is illustrated in a see-through perspective view. The exemplary optical structure may be formed using a silicon-on-insulator (SOI) substrate that contains a silicon substrate 10, a buried insulating layer 20 including silicon oxide, and a top semiconductor layer. The silicon substrate 10 may have a thickness in a range from 500 microns to 1 mm. The thickness of the buried insulating layer 20 may be determined to minimize optical reflection at an interface with the silicon substrate 10. For example, the thickness of the buried insulating layer 20 may be in a range from 100 nm to 400 nm, and may be about 200 nm, although lesser and greater thicknesses may also be used. The buried insulating layer 20 may include silicon oxide such as thermal silicon oxide, i.e., a stoichiometric silicon oxide having a composition of $SiO_2$ and formed by thermal oxidation of silicon.

The top semiconductor layer may be patterned to provide a silicon grating structure 30. The silicon grating structure 30 comprises a one-dimensional periodic array of silicon line structures 32 adjoined to a top surface of a silicon plate having a uniform height. One end, which is herein referred to as a distal end, of the silicon plate may be tapered to provide a variable width that decreases with a lateral distance from the one-dimensional periodic array of silicon line structures 32. The vertical distance between the top surfaces of the silicon line structures 32 and the bottom surface of the silicon plate may be in a range from 10 nm to 300 nm, and may be selected depending on the wavelength of the light to be used for optical communication. In one embodiment, the vertical distance may be about 220 nm. The pitch of the silicon line structures 32 along the direction perpendicular to the lengthwise direction of the silicon line structures 32, i.e., along the direction of the pitch of the silicon line structures 32 which is the same as the lengthwise direction of the silicon grating structure 30, may be the same as the wavelength of the light to be used for optical communication within the medium of silicon in the silicon grating structure 30 along the direction of the periodicity of the silicon grating structure 30. Because the relative permittivity of silicon (i.e., the dielectric constant of silicon) is about 11.7, the pitch of the silicon line structures 32 along the lengthwise direction of the silicon grating structure 30 may be the same as the wavelength of the light to be used for optical communication divided by 11.7. For example, the pitch of the silicon line structures 32 along the direction of the periodicity of the silicon grating structure 30 may be in a range from 80 nm to 200 nm, although lesser and greater pitches may also be used. A silicon photonics device 50 may be coupled to the distal end of the silicon grating structure 30. For example, an optical switch, a light source, or a light detector may be coupled to the distal end of the silicon grating structure 30.

The silicon grating structures 30 may be formed by patterning the top semiconductor layer using two patterning processes. A first patterning process may be used to define the boundaries of the silicon grating structure 30. A second patterning process may be used to recess areas of the silicon grating structure 30 that are located outside the areas of the silicon line structures 32. Each silicon line structures 32 may have a same vertical cross-sectional shape within a vertical plane that extends along the lengthwise direction of the silicon grating structure 30. In one embodiment, each silicon line structures 32 may have a same rectangular cross-sectional shape within a vertical plane that extends along the lengthwise direction of the silicon grating structure 30.

The silicon grating structure 30 may be used to provide optical coupling between an optical fiber 80 and the silicon photonics device 50, which may be provided over the buried insulating layer 20. Specifically, a combination of the silicon grating structure 30, at least one dielectric material layer ({62, 63, 64}; collectively referred to as at least one dielectric material layer 60) overlying the silicon grating structure 30 and providing contrast in refractive indices at an interface with the silicon grating structure 30, and a passivation dielectric layer 70 overlying the at least one dielectric material layer 60 and including an opening 69 therethrough.

Generally, the at least one dielectric material layer 60 may be formed over the silicon grating structure 30 with a planar top surface, i.e., a top surface contained within a horizontal plane. In one embodiment, the at least one dielectric material layer 60 may include, from bottom to top, a first silicon oxide layer 62 contacting the silicon grating structure 30, a contact etch stop liner (CESL) 63 overlying the first silicon oxide layer 62, and a second silicon oxide layer 64 contacting the contact etch stop liner 63.

The first silicon oxide layer 62 may be formed by deposition and planarization of a silicon oxide material. In one embodiment, the first silicon oxide layer 62 may be deposited by chemical vapor deposition, and the top surface of the first silicon oxide layer 62 may be planarized by a chemical mechanical planarization process. Alternatively, the first silicon oxide layer 62 may be formed by a self-planarizing deposition process such as spin coating. The first silicon oxide layer 62 may have a thickness, as measured from a topmost surface of the silicon grating structure 30 to an interface with the contact etch stop liner 63, in a range from 5 microns to 10 microns, although lesser and greater thicknesses may also be used.

The contact etch stop liner 63 includes a dielectric material that may function as an etch stop material during formation of contact via structures (not expressly illustrated) that contact various components of the silicon photonics device. The contact etch stop liner 63 may include a dielectric material such as a dielectric metal oxide (such as aluminum oxide, titanium oxide, tantalum oxide, yttrium oxide, etc.), silicon nitride, silicon carbide, and/or silicon oxide carbide. The thickness of the contact etch stop liner 63 may be selected to minimize optical interference with the light that is transmitted between the silicon grating structure 30 and the optical fiber 80. For example, the thickness of the contact etch stop liner 63 may be in a range from 20 nm to 100 nm, although lesser and greater thicknesses may also be used.

The second silicon oxide layer 64 may be formed by deposition of a silicon oxide material. For example, chemical vapor deposition may be used to deposit the second silicon oxide layer 64. The second silicon oxide layer 64 may have a thickness in a range from 150 nm to 500 nm, although lesser and greater thicknesses may also be used.

According to an embodiment of the present disclosure, at least one dielectric etch stop layer 66 may be deposited over the at least one dielectric material layer 60. The at least one dielectric etch stop layer 66 includes a dielectric material that is different from the dielectric material of a dielectric passivation layer to be subsequently deposited. The at least one dielectric etch stop layer 66 comprises at least one dielectric material selected from silicon nitride and silicon oxynitride. The at least one dielectric etch stop layer 66 may consist of a single dielectric etch stop layer, or may include a plurality of dielectric etch stop layers, which may, or may not, be patterned. The total thickness of the at least one dielectric etch stop layer 66 may be in a range from 20 nm to 300 nm, although lesser and greater thicknesses may also be used. The various configurations of the at least one dielectric etch stop layer 66 are described in detail in subsequent sections. Generally, the at least one dielectric etch stop layer 66 is used to prevent local over etching of underlying portions of the at least one dielectric material layer 60. Particularly, the at least one dielectric material layer 60 may be used to prevent overetching of the underlying portions of the at least one dielectric material layer 60 at a periphery of an opening through a passivation dielectric layer to be subsequently formed.

Subsequently, a passivation dielectric layer 70 including a dielectric material may be deposited over the at least one dielectric etch stop layer 66. The passivation dielectric layer 70 may include one or more of silicon carbide, silicon nitride, undoped silicate glass, a doped silicate glass, silicon oxynitride, organosilicate glass, or a low dielectric constant (low-k) dielectric material such as porous organosilicate glass. In one embodiment, the thickness of the passivation dielectric layer 70 may be selected to provide sufficient shielding of ambient light to prevent optical noise from entering the silicon grating structure 30 or the silicon photonics device 50. In an illustrative example, the passivation dielectric layer 70 may have a thickness in a range from 3 microns to 30 microns, such as from 4 microns to 10 microns, although lesser and greater thicknesses may also be used. In one embodiment, the passivation dielectric layer 70 may be formed by chemical vapor deposition process.

A patterned etch mask layer such as a patterned photoresist layer (not shown) may be formed over the passivation dielectric layer 70. The patterned etch mask layer may include an opening in an area that overlies an end portion of the silicon grating structure 30. An opening 69 may be formed through an unmasked portion of the passivation dielectric layer 70 by performing an anisotropic etch process. The anisotropic etch process may etch the dielectric material of the passivation dielectric layer 70 selective to a dielectric material within the at least one dielectric etch stop layer 66 using the patterned etch mask layer as a masking structure. In one embodiment, the passivation dielectric layer 70 may have an initial thickness prior to the anisotropic etch process. The duration of the anisotropic etch process may be selected such that the opening 69 may be free of the dielectric material of the passivation dielectric layer 70, or comprises the dielectric material of the passivation dielectric layer 70 at a thickness less than 10% (such as less than 5% and/or less than 2% and/or less than 1%) of the initial thickness of the passivation dielectric layer 70. While a uniform thickness is desirable for any remaining portion of the dielectric material underneath the opening 69 in the passivation dielectric layer 70, a non-uniform thickness distribution of the remaining portion of the dielectric material of the passivation dielectric layer 70 underneath the opening 69 in the passivation dielectric layer 70 is common. Typically, any remaining portion of the dielectric material of the passivation dielectric layer 70 underneath the opening 69 in the passivation dielectric layer 70 may have a greater thickness at a center region of the opening 69 and has a lesser thickness, or is completely etched, at a peripheral regions of the opening 69. In addition, a portion of the at least one dielectric etch stop layer 66 may be collaterally etched at the peripheral portion of the opening 69. The lateral dimensions of the opening 69 may be in a range from 2 microns to 10 microns, such as from 3 microns to 6 microns, although greater or smaller lateral dimensions may be used. For example, the opening 69 may have a rectangular horizontal shape in which each side has a length in a range from 2 microns to 10 microns, such as from 3 microns to 6 microns, although lesser and greater lengths may also be used.

According to an embodiment of the present disclosure, use of silicon oxide or silicon nitride for the at least one dielectric etch stop layer 66 increases the etch resistance for the at least one dielectric etch stop layer 66 during the anisotropic etch process. According to some embodiments of the present disclosure, the at least one dielectric etch stop layer 66 may be formed at the periphery of the opening 69 to increase etch resistance while proving a lesser thickness for the dielectric etch stop layer 66 at the center region of the opening 69 so that optical effects due to the dielectric etch stop layer 66 are minimized. In one embodiment, the passivation dielectric layer 70 may continuously extend in the opening 69 and may have a thickness in a range from 1 nm to 200 nm, and has a thickness in a range from 3 microns to 30 microns outside the opening in the passivation dielectric layer 70. Alternatively, a discrete remaining portion of the dielectric material of the passivation dielectric layer 70 (not expressly shown) that is not physically connected to the passivation dielectric layer 70 may be formed at a center portion of the opening 69. The discrete portion of the dielectric material of the passivation dielectric layer 70 may have a variable thickness that may be in a range from 1 nm to 200 nm. The discrete portion of the dielectric material in the opening 69 may have the same material composition as a planar portion of the passivation dielectric layer 70 having a uniform thickness (which is the initial thickness).

Subsequently, an optical fiber 80 may be disposed over the opening 69 in the passivation dielectric layer 70. The optical fiber 80 comprises an end surface for receiving or emitting light 82 that is directed at the opening 69 in the passivation dielectric layer 70.

Generally, the exemplary optical structure illustrated in FIG. 1 may include a silicon grating structure 30 located over a buried insulating layer 20; at least one dielectric material layer 60 overlying, and contacting, the silicon grating structure 30; at least one dielectric etch stop layer 66 overlying the at least one dielectric material layer 60 and comprising at least one dielectric material selected from silicon nitride and silicon oxynitride; a passivation dielectric layer 70 comprising a dielectric material and overlying the at least one dielectric etch stop layer 66 and including an opening 69 overlying an end portion of the silicon grating structure 30, wherein the opening 69 is free of the dielectric material of the passivation dielectric layer 70 or comprises the dielectric material of the passivation dielectric layer 70 at a thickness less than 10% of a thickness of the passivation dielectric layer 70 outside the opening 69; and an optical fiber 80 overlying the opening 69 in the passivation dielectric layer 70 and comprising an end surface for receiving or emitting light 82 that is directed at the opening 69 in the passivation dielectric layer 70.

The at least one dielectric etch stop layer 66 may be provided in various configurations, which are now described with reference to FIGS. 2A-7C.

Figure 2A:
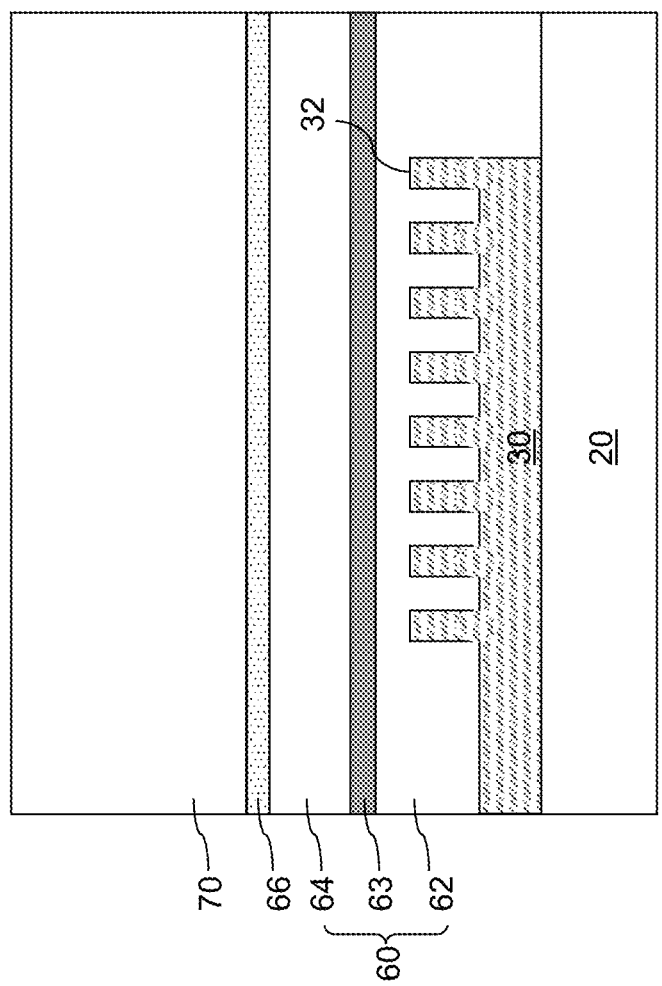
FIG. 2A is a vertical cross-sectional view of a first configuration of the exemplary optical structure after formation of a passivation dielectric layer according to an embodiment of the present disclosure.

FIG. 2A is a vertical cross-sectional view of a first configuration of the exemplary optical structure after formation of a passivation dielectric layer 70 according to an embodiment of the present disclosure. In the first configuration, the at least one dielectric etch stop layer 66 comprises a single dielectric etch stop layer 66 having a homogenous material composition and contacts a planar top surface of the at least one dielectric material layer 60 and a bottom surface of the passivation dielectric layer 70 over an entire area of the silicon grating structure 30. In other words, the single dielectric etch stop layer 66 continuously extends over the entire area of the silicon grating structure 30. In one embodiment, the single dielectric etch stop layer 66 may be formed as a blanket dielectric material layer, i.e., an unpatterned dielectric material layer. The single dielectric etch stop layer 66 may be deposited chemical vapor deposition. In one embodiment, the single dielectric etch stop layer 66 may consist essentially of silicon nitride. In another embodiment, the single dielectric etch stop layer 66 may consist essentially of silicon oxynitride including nitrogen atoms at an atomic concentration greater than 10%, such as from 15% to 50%. The thickness of the single dielectric etch stop layer 66 may be in a range from 20 nm to 150 nm, such as from 30 nm to 70 nm, although lesser and greater thicknesses may also be used.

Figure 2B:
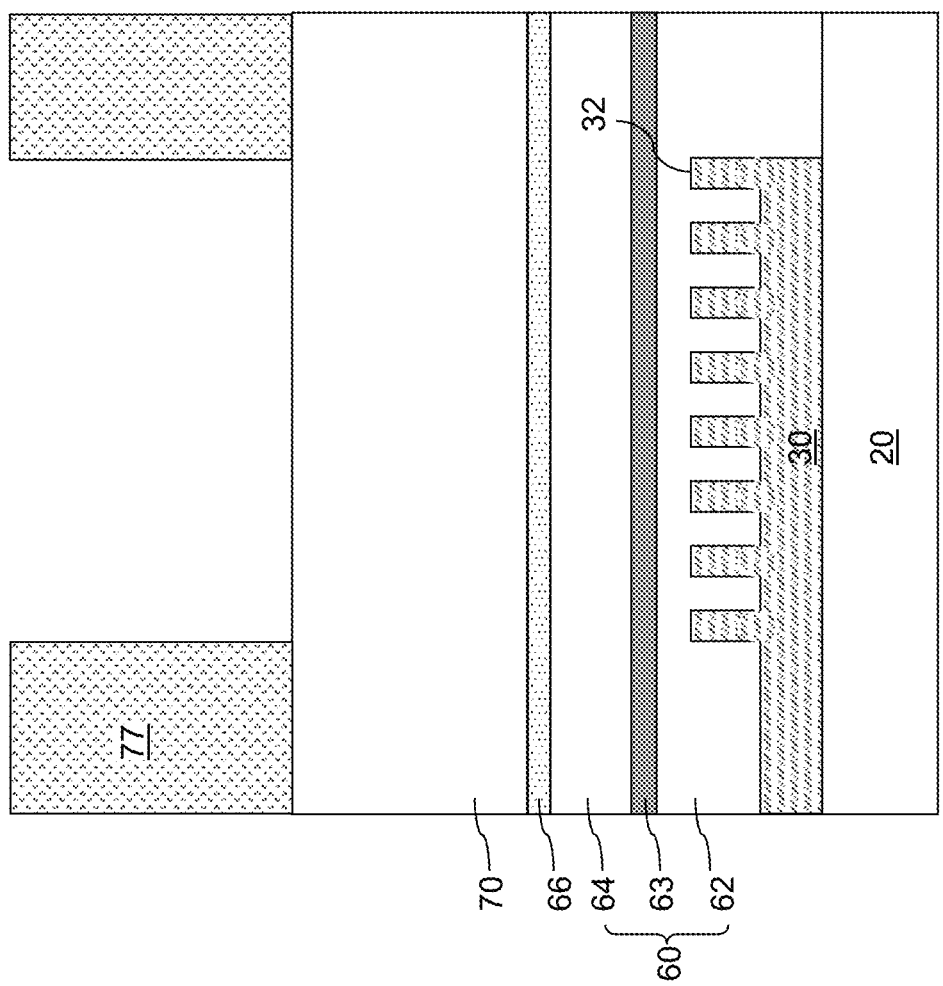
FIG. 2B is a vertical cross-sectional view of the first configuration of the exemplary optical structure after formation of a patterned etch mask layer according to an embodiment of the present disclosure.

FIG. 2B is a vertical cross-sectional view of the first configuration of the exemplary optical structure after formation of a patterned etch mask layer 77 according to an embodiment of the present disclosure. In one embodiment, the patterned etch mask layer 77 may be a patterned photoresist layer, which may be formed by applying a blanket photoresist material layer over the passivation dielectric layer 70 and by patterning the blanket photoresist material layer by lithographic exposure and development. The opening in the patterned etch mask layer 77 may be formed over a distal end portion of the silicon grating structure 30 that includes the silicon line structures 32. At least one sidewall of the opening in the patterned etch mask layer 77 may extend over the silicon grating structure 30.

Figure 2C:
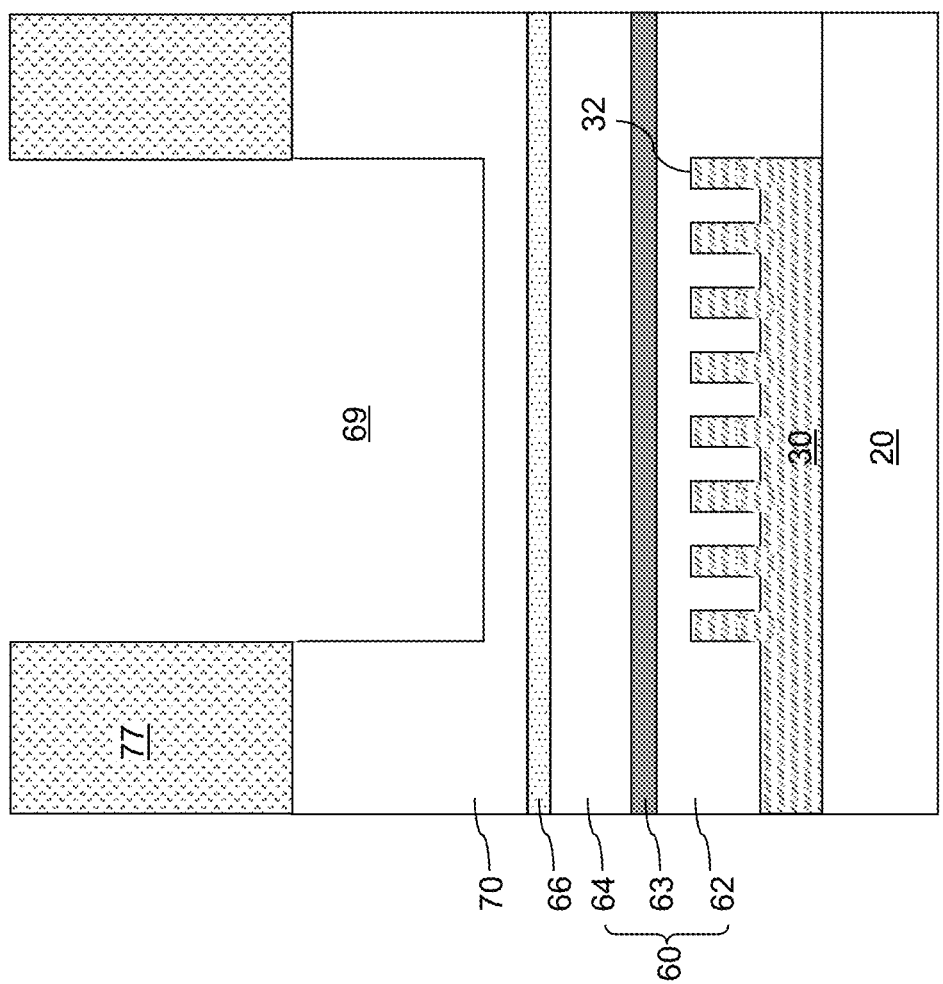
FIG. 2C is a vertical cross-sectional view of the first configuration of the exemplary optical structure after formation of an opening through the passivation dielectric layer according to an embodiment of the present disclosure.

FIG. 2C is a vertical cross-sectional view of the first configuration of the exemplary optical structure after formation of an opening 69 through the passivation dielectric layer 70 according to an embodiment of the present disclosure. An anisotropic etch process is performed to etch the unmasked portions of the passivation dielectric layer 70. The anisotropic etch process may have an etch chemistry that etches the dielectric material of the passivation dielectric layer 70 selective to silicon nitride or silicon oxynitride of the single dielectric etch stop layer 66. In one embodiment, the anisotropic etch process may use a fluorine plasma generated from at least one hydrofluorocarbon gas and/or at least one fluorocarbon gas. In one embodiment, the duration of the anisotropic etch process may be selected such that the opening 69 is free of the dielectric material of the passivation dielectric layer 70, or comprises the dielectric material of the passivation dielectric layer 70 at a thickness less than 10% (such as less than 5%, and/or less than 2%, and/or less than 1%) of the passivation dielectric layer thickness (i.e., the thickness of the passivation dielectric layer 70 underneath the patterned etch mask layer 77).

Figure 2D:
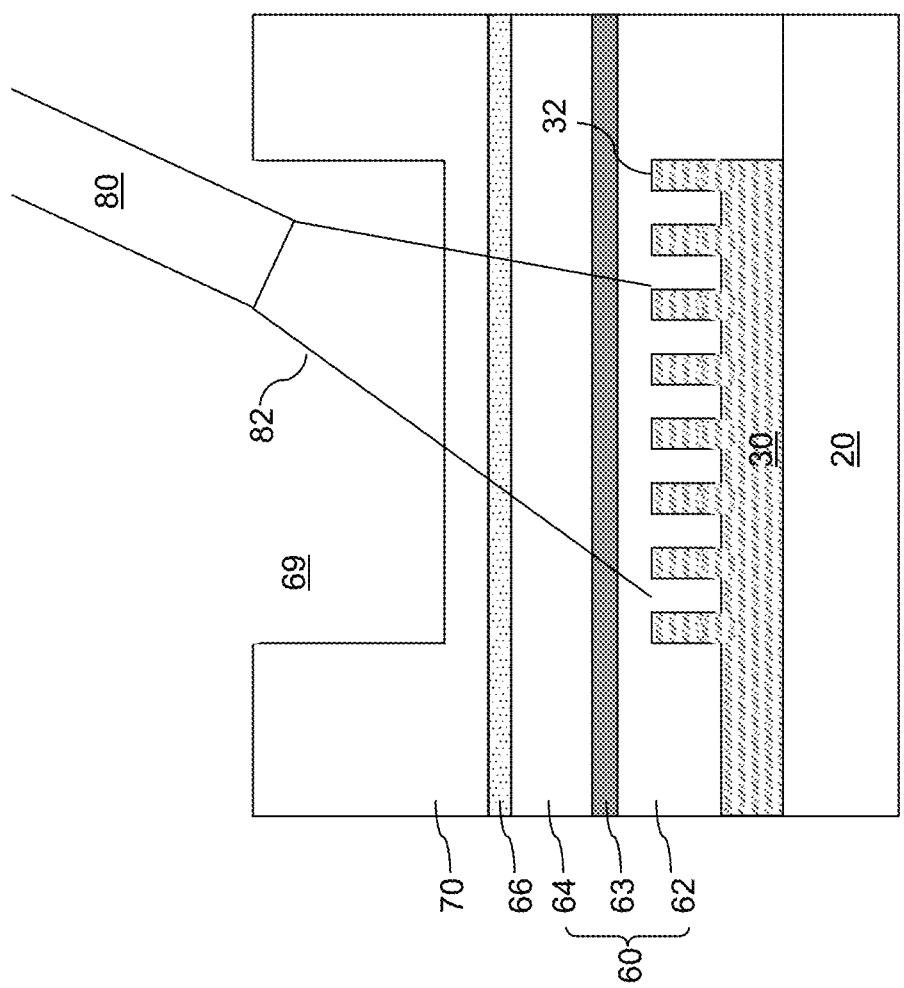
FIG. 2D is a vertical cross-sectional view of the first configuration of the exemplary optical structure after attaching the optical fiber according to an embodiment of the present disclosure.

FIG. 2D is a vertical cross-sectional view of the first configuration of the exemplary optical structure after removal of the patterned etch mask layer 77 and attaching an optical fiber 80 according to an embodiment of the present disclosure. The patterned etch mask layer 77 may be removed, for example, by ashing. An optical fiber 80 may be disposed in a manner that induces optical coupling of light 82 between the silicon grating structure 30 and the optical fiber 80. The optical fiber 80 may be affixed to a target position using an optical molding compound (not shown), which may fill the opening 69 in the passivation dielectric layer 70. FIG. 2D illustrates an embodiment in which the passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform.

Figure 2E:
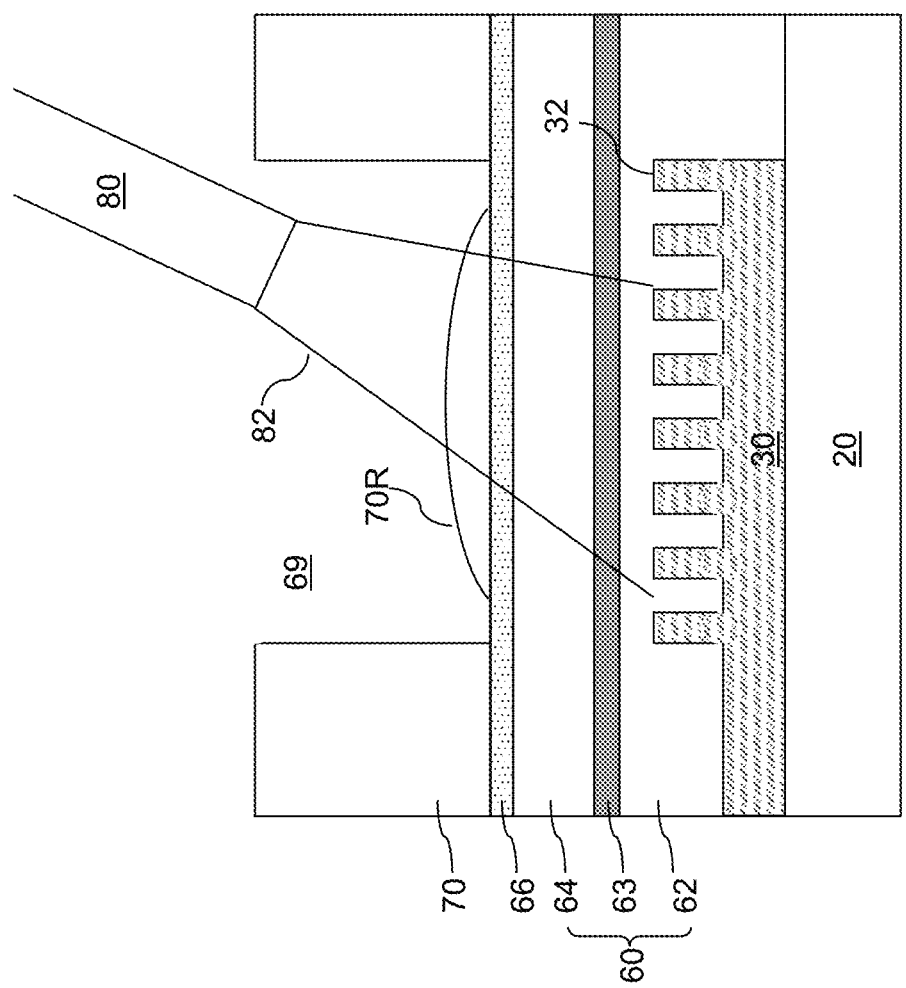
FIG. 2E is a vertical cross-sectional view of an alternative embodiment of the first configuration of the exemplary optical structure after attaching the optical fiber according to an embodiment of the present disclosure.

FIG. 2E is a vertical cross-sectional view of an alternative embodiment of the first configuration of the exemplary optical structure after removal of the patterned etch mask layer 77 and attaching the optical fiber 80 according to an embodiment of the present disclosure. In this embodiment, a dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material of the passivation dielectric layer 70 that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 3A:
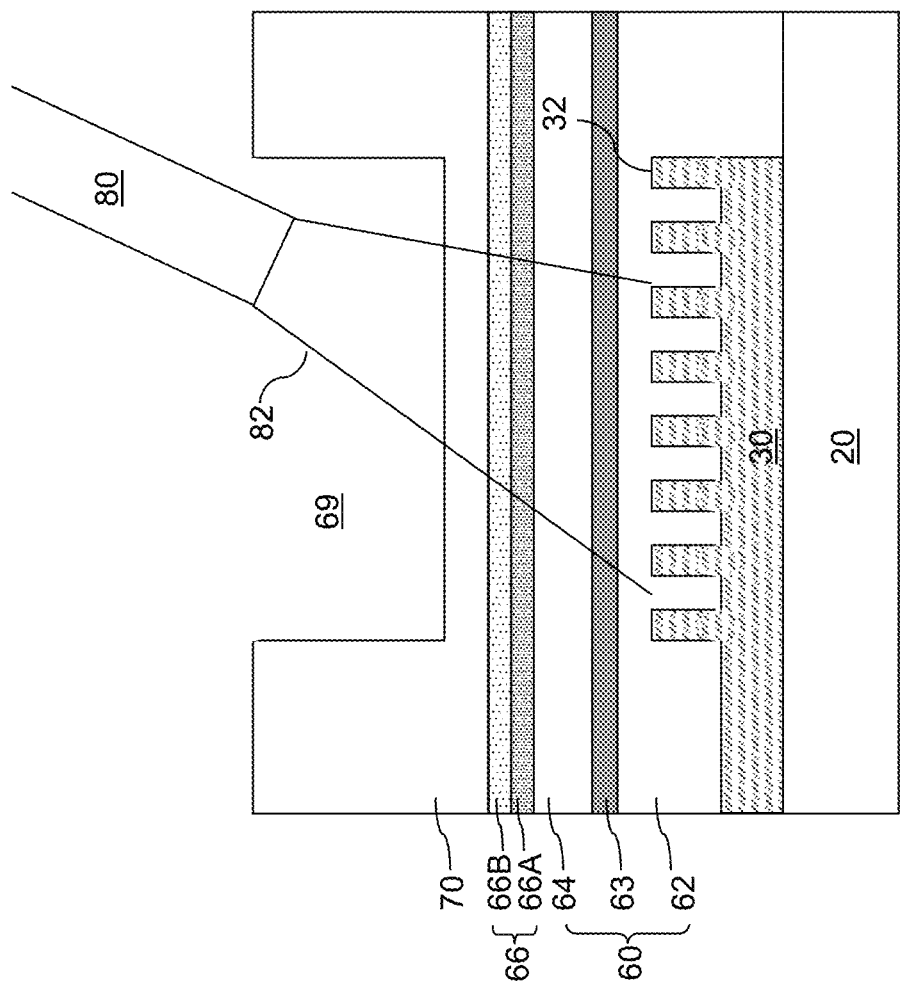
FIG. 3A is a vertical cross-sectional view of a second configuration of the exemplary optical structure according to an embodiment of the present disclosure.

FIG. 3A is a vertical cross-sectional view of a second configuration of the exemplary optical structure according to an embodiment of the present disclosure. In the second configuration, the at least one dielectric etch stop layer 66 comprises a layer stack of a first dielectric etch stop layer 66A and a second dielectric etch stop layer 66B that overlies at least a portion of the first dielectric etch stop layer 66A and including a different dielectric material than the first dielectric etch stop layer 66A. In one embodiment, the first dielectric etch stop layer 66A comprises, and/or consists essentially of, a silicon carbide layer, and the second dielectric etch stop layer 66B comprises, and/or consists essentially of, silicon nitride or silicon oxynitride. In one embodiment, the second dielectric etch stop layer 66B may consist essentially of silicon nitride. In another embodiment, the second dielectric etch stop layer 66B may consist essentially of silicon oxynitride including nitrogen atoms at an atomic concentration greater than 10%, such as from 15% to 50%. The thickness of the first dielectric etch stop layer 66A may be in a range from 20 nm to 150 nm, such as from 30 nm to 70 nm, although lesser and greater thicknesses may also be used. The thickness of the second dielectric etch stop layer 66B may be in a range from 20 nm to 150 nm, such as from 30 nm to 70 nm, although lesser and greater thicknesses may also be used.

Each of the first dielectric etch stop layer 66A and the second dielectric etch stop layer 66B may be formed as a blanket material layer, i.e., an unpatterned material layer having a uniform thickness throughout the entire area of the respective material layer. In one embodiment, each of the first dielectric etch stop layer 66A and the second dielectric etch stop layer 66B may be deposited by a respective chemical vapor deposition process. The first dielectric etch stop layer 66A functions as an additional etch stop structure in embodiments in which any portion of the second dielectric etch stop layer 66B is etched through during a subsequent anisotropic etch process. Each of the first dielectric etch stop layer 66A and the second dielectric etch stop layer 66B continuously extends over an entire area of the silicon grating structure 30 with a respective uniform thickness.

After formation of the first dielectric etch stop layer 66A and the second dielectric etch stop layer 66B, the passivation dielectric layer 70 may be formed. Subsequently, the processing steps of FIGS. 2B, 2C, and 2D may be performed to provide the structure illustrated in FIG. 3A. The passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform.

Figure 3B:
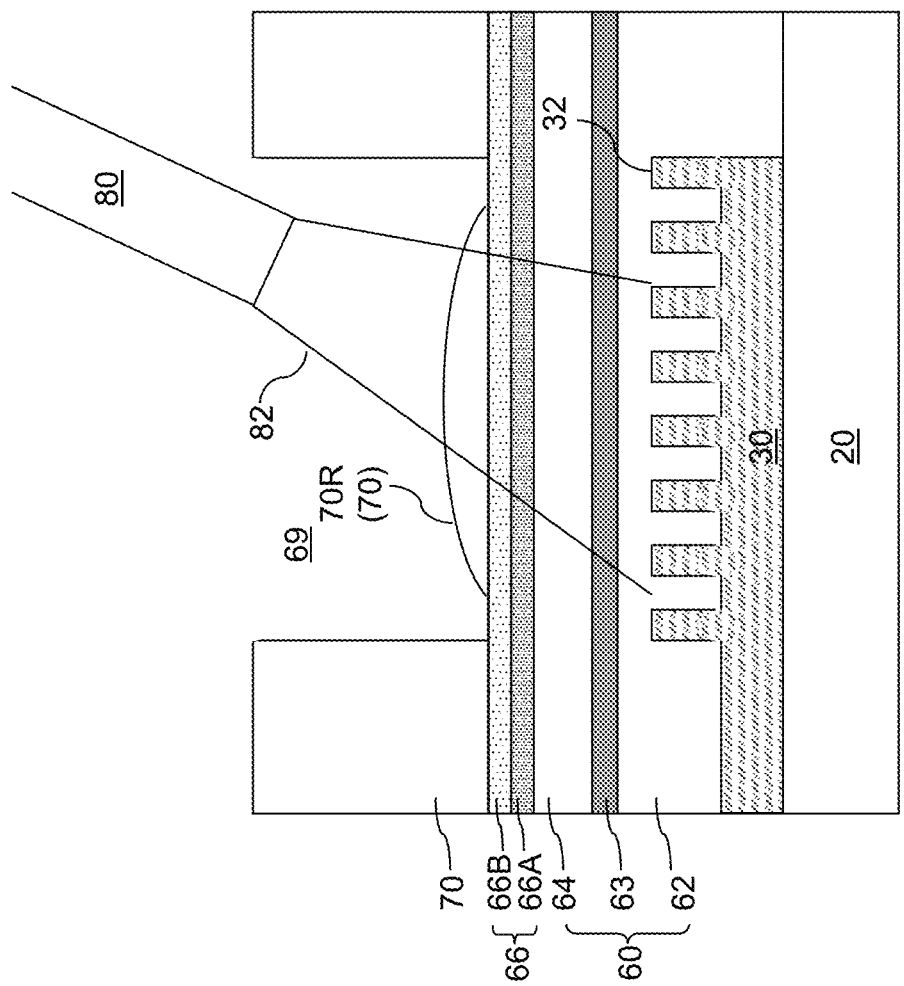
FIG. 3B is a vertical cross-sectional view of an alternative embodiment of the second configuration of the exemplary optical structure according to an embodiment of the present disclosure.

FIG. 3B is a vertical cross-sectional view of an alternative embodiment of the second configuration of the exemplary optical structure according to an embodiment of the present disclosure. A dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material of the passivation dielectric layer 70 that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 4A:
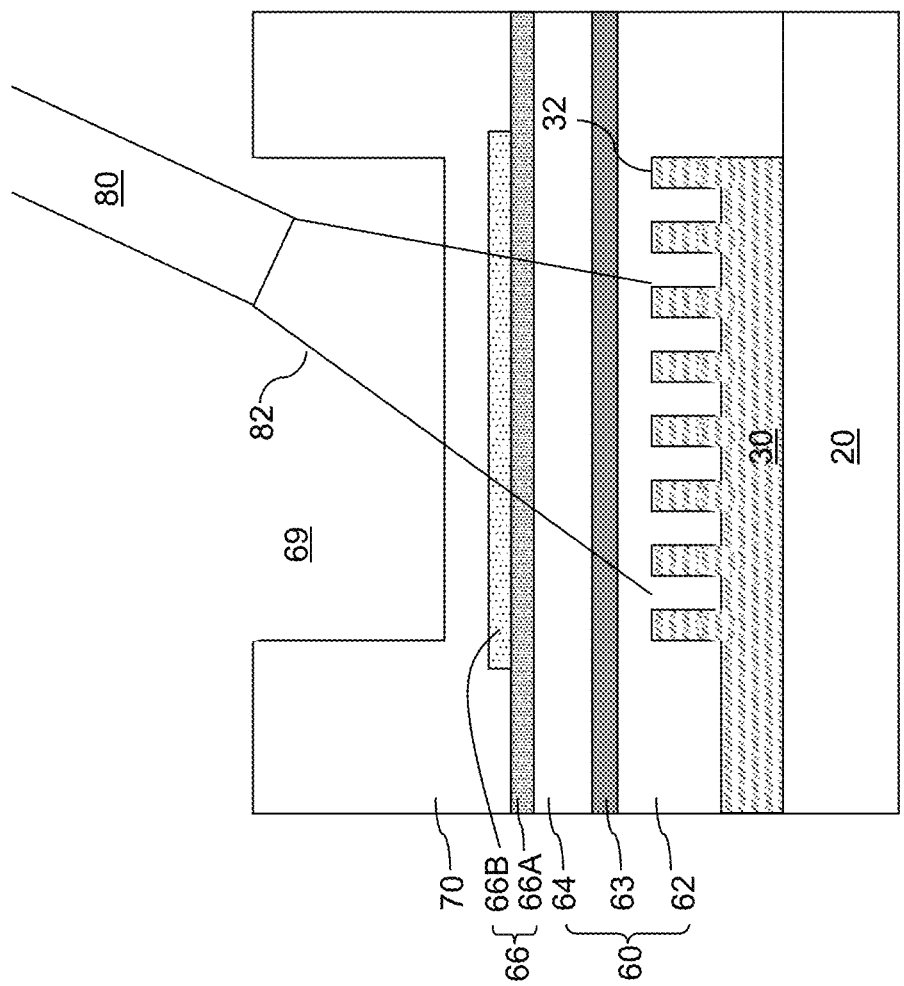
FIG. 4A is a vertical cross-sectional view of a fourth configuration of the exemplary optical structure according to an embodiment of the present disclosure.

FIG. 4A is a vertical cross-sectional view of a fourth configuration of the exemplary optical structure according to an embodiment of the present disclosure. The fourth configuration of the exemplary optical structure may be derived from the second configuration of the exemplary optical structure by patterning the second dielectric etch stop layer 66B. Specifically, the second dielectric etch stop layer 66B may be deposited as a blanket material layer, and a photoresist layer (not shown) may be applied and patterned over the second dielectric etch stop layer 66B to cover a portion of the second dielectric etch stop layer 66B. The area of the second dielectric etch stop layer 66B that is covered with the patterned photoresist layer may include the entire area of the opening 69 in the passivation dielectric layer 70 to be subsequently formed.

Subsequently, the processing steps of FIGS. 2B, 2C, and 2D may be performed to provide the structure illustrated in FIG. 4A. The passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform.

Figure 4B:
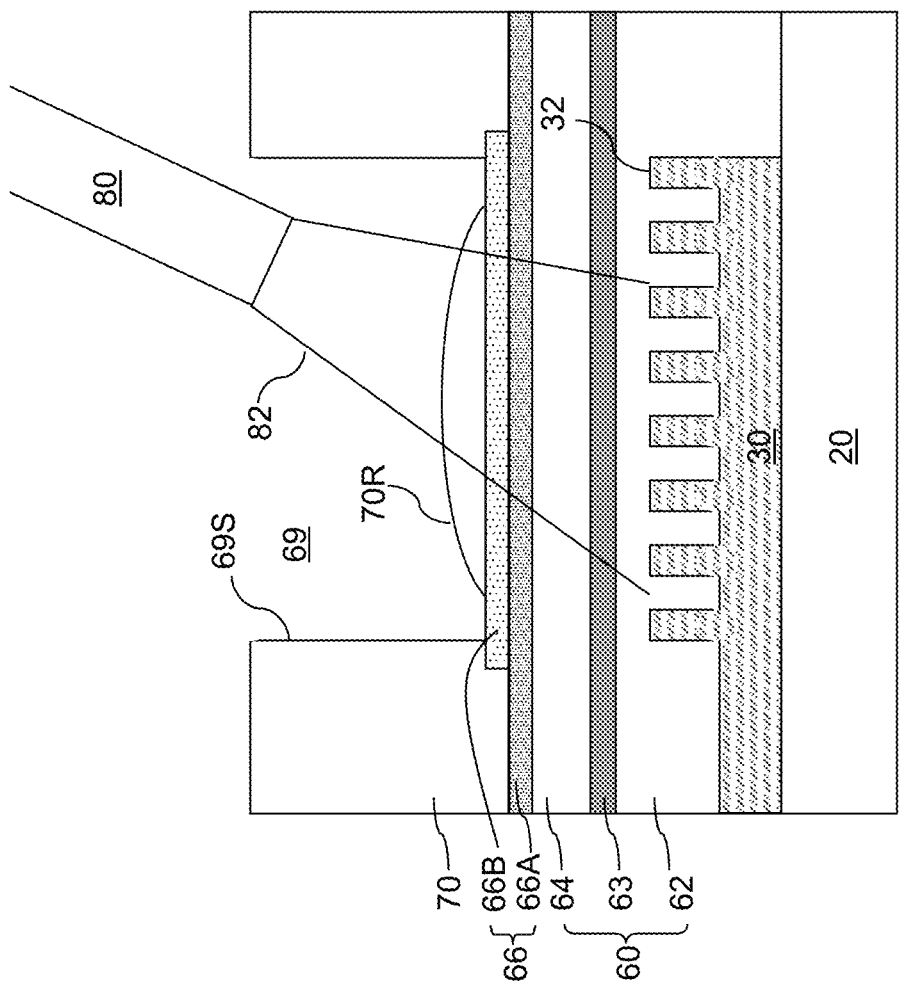
FIG. 4B is a vertical cross-sectional view of an alternative embodiment of the fourth configuration of the exemplary optical structure according to an embodiment of the present disclosure.

FIG. 4B is a vertical cross-sectional view of an alternative embodiment of the fourth configuration of the exemplary optical structure according to an embodiment of the present disclosure. A dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 4C:
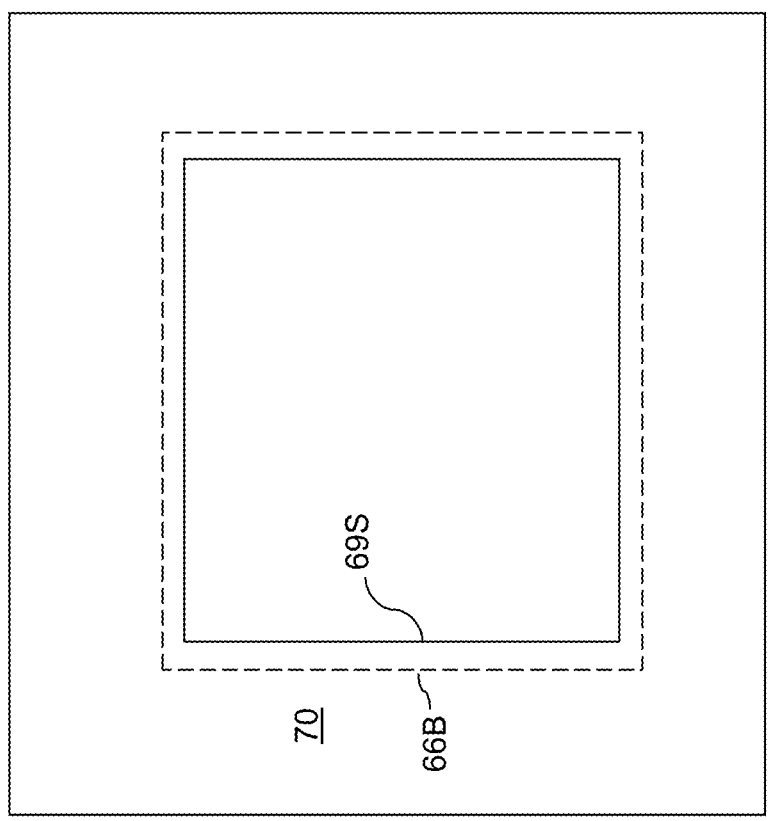
FIG. 4C is a plan view of the fourth configuration of the exemplary optical structure according to an embodiment of the present disclosure.

FIG. 4C is a plan view of the fourth configuration of the exemplary optical structure of FIG. 4A or FIG. 4B according to an embodiment of the present disclosure. The first dielectric etch stop layer 66A continuously extends over an entire area of the silicon grating structure 30, and the second dielectric etch stop layer 66B comprises a periphery that laterally surrounds an area defined by sidewalls 69S of the opening 69. At least one segment of the periphery of the second dielectric etch stop layer 66B straddles the silicon grating structure 30.

Figure 5A:
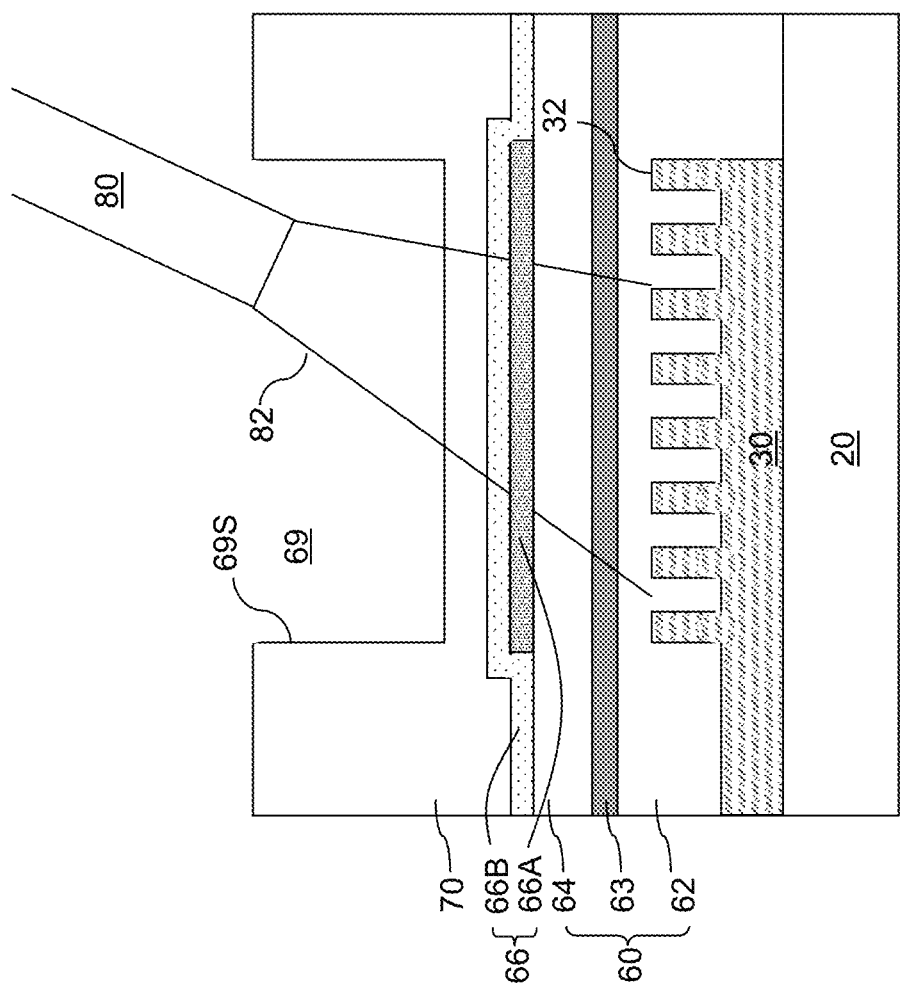
FIG. 5A is a vertical cross-sectional view of a fourth configuration of the exemplary optical structure according to an embodiment of the present disclosure.

FIG. 5A is a vertical cross-sectional view of a fourth configuration of the exemplary optical structure according to an embodiment of the present disclosure. The fourth configuration of the exemplary optical structure may be derived from the second configuration of the exemplary optical structure by patterning the first dielectric etch stop layer 66A. Specifically, the first dielectric etch stop layer 66A may be deposited as a blanket material layer, and a photoresist layer (not shown) may be applied and patterned over the second dielectric etch stop layer 66B to cover a portion of the first dielectric etch stop layer 66A. The area of the first dielectric etch stop layer 66A that is covered with the patterned photoresist layer may include the entire area of the opening 69 in the passivation dielectric layer 70 to be subsequently formed. Subsequently, the second dielectric etch stop layer 66B may be formed over the first dielectric etch stop layer 66A. The second dielectric etch stop layer 66B may contact surfaces of the first dielectric etch stop layer 66A and a portion of a topmost surface of the at least one dielectric material layer 60.

Subsequently, the processing steps of FIGS. 2B, 2C, and 2D may be performed to provide the structure illustrated in FIG. 5A. The passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform.

Figure 5B:
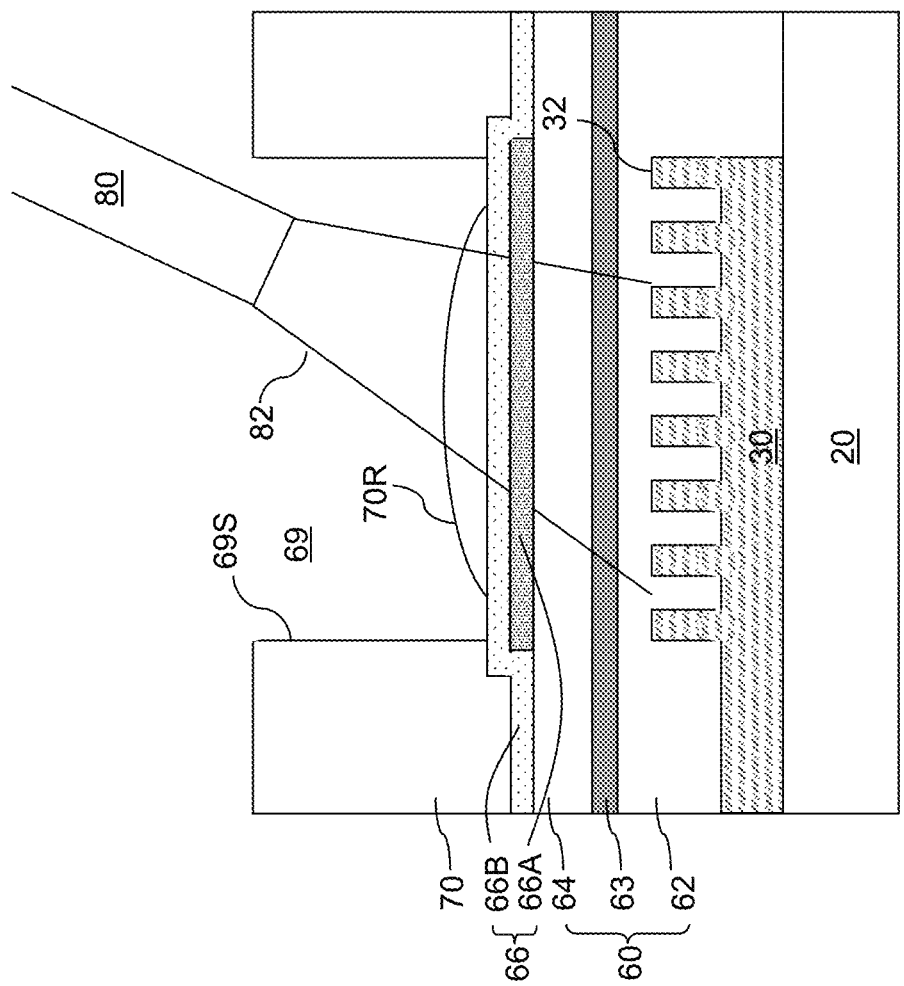
FIG. 5B is a vertical cross-sectional view of an alternative embodiment of the fourth configuration of the exemplary optical structure according to an embodiment of the present disclosure.

FIG. 5B is a vertical cross-sectional view of an alternative embodiment of the fourth configuration of the exemplary optical structure according to an embodiment of the present disclosure. A dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 5C:
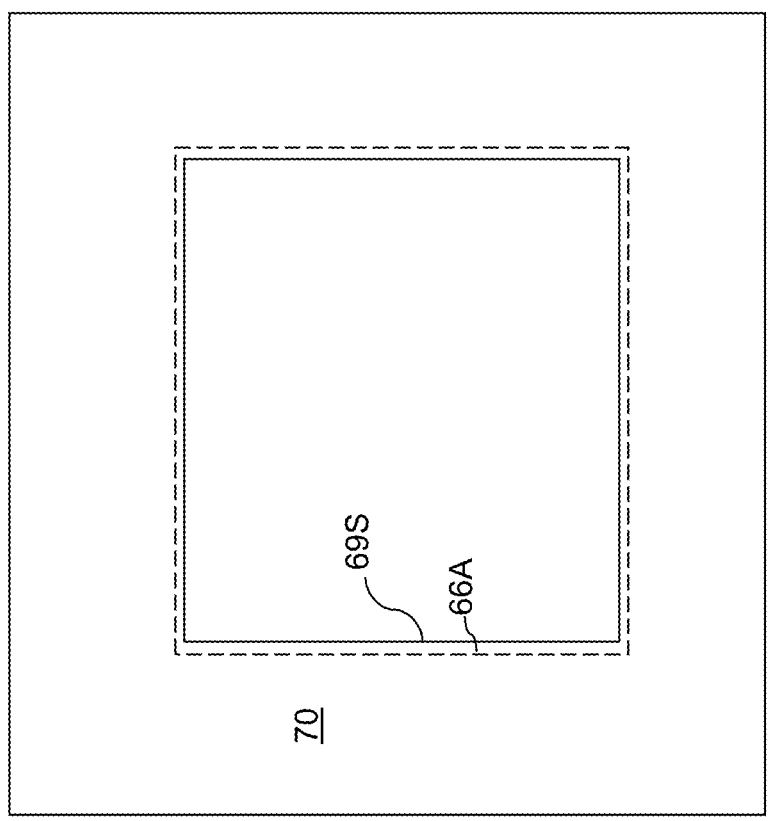
FIG. 5C is a plan view of the fourth configuration of the exemplary optical structure according to an embodiment of the present disclosure.

FIG. 5C is a plan view of the fourth configuration of the exemplary optical structure of FIG. 5A or FIG. 5B according to an embodiment of the present disclosure. The first dielectric etch stop layer 66A comprises a periphery that laterally surrounds an area defined by sidewalls 69S of the opening 69 in the passivation dielectric layer 70. At least one segment of the periphery of the first dielectric etch stop layer 66A straddles the silicon grating structure 30. The second dielectric etch stop layer 66B continuously extends over the entire area of the silicon grating structure 30.

Figure 6A:
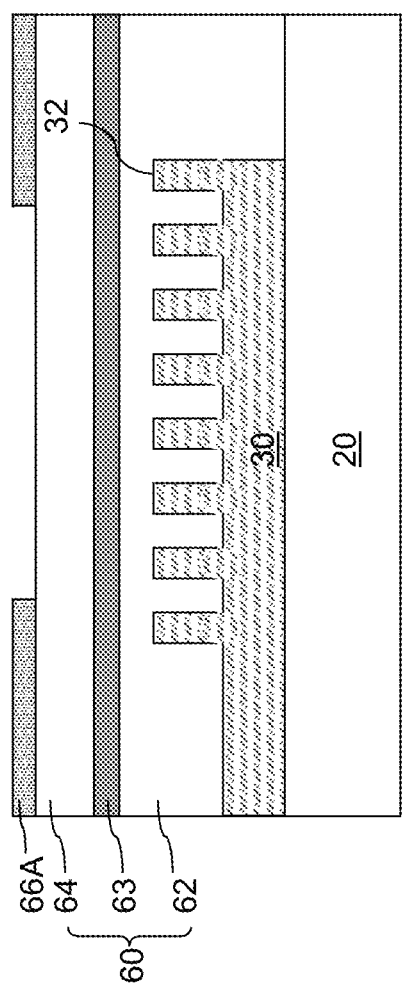
FIG. 6A is a vertical cross-sectional view of a fifth configuration of the exemplary optical structure after formation of a first patterned dielectric etch stop layer according to an embodiment of the present disclosure.

FIG. 6A is a vertical cross-sectional view of a fifth configuration of the exemplary optical structure after formation of a first patterned dielectric etch stop layer 66A according to an embodiment of the present disclosure. The fifth configuration of the exemplary optical structure may be derived from the second configuration of the exemplary optical structure by patterning the first dielectric etch stop layer 66A. Specifically, the first dielectric etch stop layer 66A may be deposited as a blanket material layer, and a photoresist layer (not shown) may be applied and patterned over the second dielectric etch stop layer 66B to form an opening in the photoresist layer within the area of the opening 69 to be subsequently formed in the passivation dielectric layer 70. The area of the first dielectric etch stop layer 66A that is not covered with the patterned photoresist layer may be located entirely within the area of the opening 69 in the passivation dielectric layer 70 to be subsequently formed. An etch process, such as an anisotropic etch process or an isotropic etch process, may be performed to etch unmasked portions of the first dielectric etch stop layer 66A. The patterned photoresist layer may be removed, for example, by ashing. Subsequently, the second dielectric etch stop layer 66B may be formed over the first dielectric etch stop layer 66A. The second dielectric etch stop layer 66B may contact surfaces of the first dielectric etch stop layer 66A and a portion of a topmost surface of the at least one dielectric material layer 60.

Figure 6B:
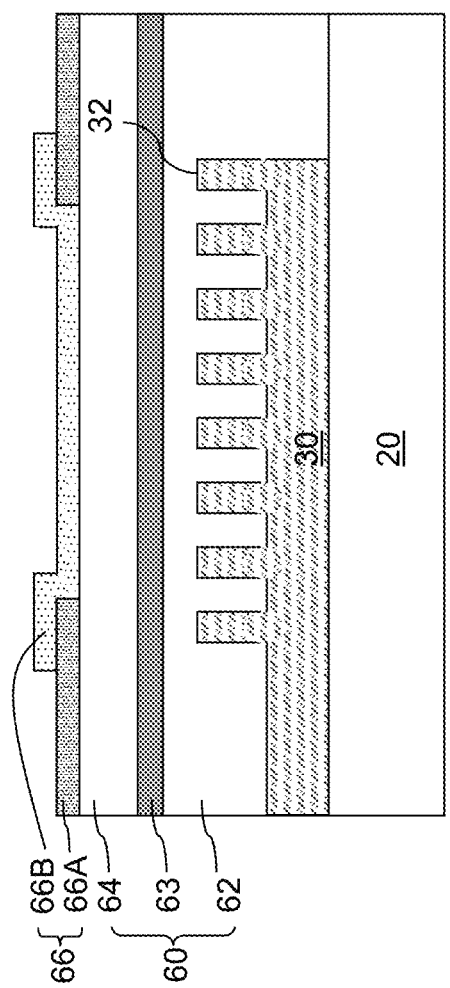
FIG. 6B is a vertical cross-sectional view of the fifth configuration of the exemplary optical structure after formation of a second patterned dielectric etch stop layer according to an embodiment of the present disclosure.

FIG. 6B is a vertical cross-sectional view of the fifth configuration of the exemplary optical structure after formation of a second patterned dielectric etch stop layer 66B according to an embodiment of the present disclosure. The second dielectric etch stop layer 66B may be deposited as a blanket material layer over the first dielectric etch stop layer 66A. The second dielectric etch stop layer 66B may contact the topmost surface of the at least one dielectric material layer 60 within the area of the opening in the first dielectric etch stop layer 66A. A photoresist layer (not shown) may be applied and patterned over the second dielectric etch stop layer 66B to cover a portion of the second dielectric etch stop layer 66B. The area of the second dielectric etch stop layer 66B that is covered with the patterned photoresist layer may include the entire area of the opening 69 in the passivation dielectric layer 70 to be subsequently formed. The periphery of the patterned second dielectric etch stop layer 66B may be laterally offset outward from a periphery of the area of the opening 69 to be subsequently formed in the passivation dielectric layer 70.

Figure 6C:
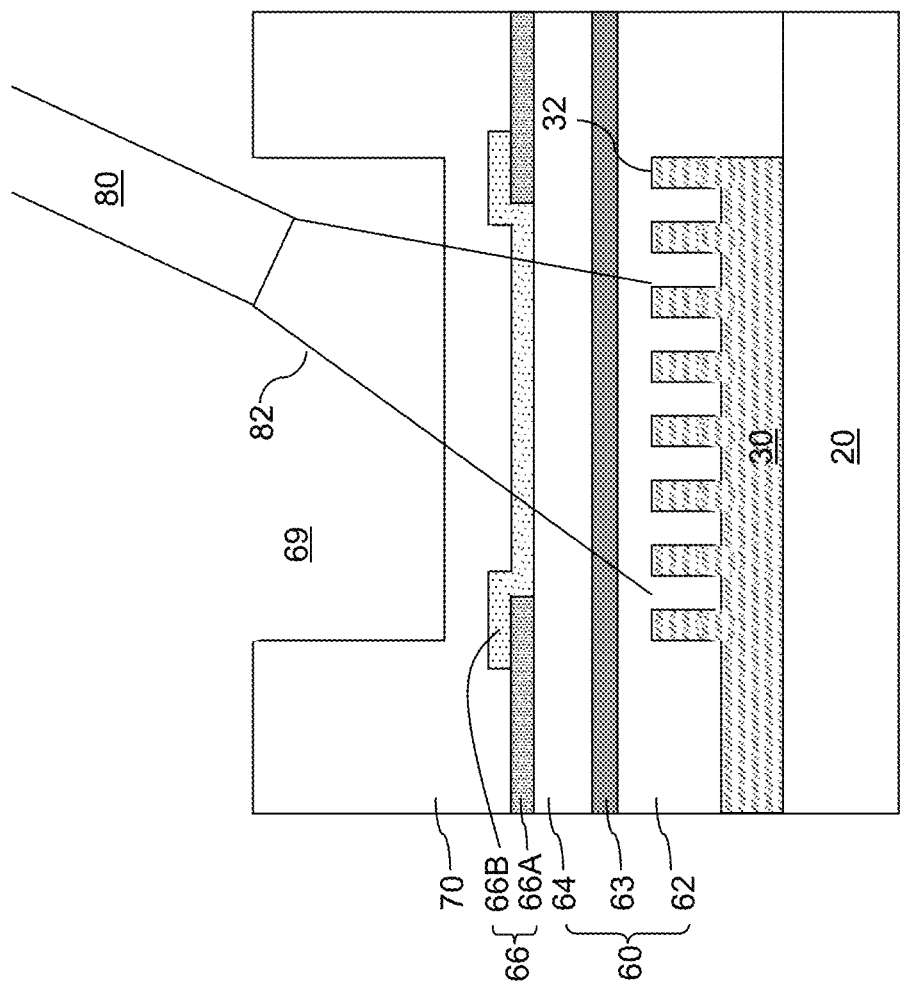
FIG. 6C is a vertical cross-sectional view of the fifth configuration of the exemplary optical structure after formation of an opening through the passivation dielectric layer according to an embodiment of the present disclosure.

Referring to FIG. 6C, the processing steps of FIGS. 2B, 2C, and 2D may be performed to provide the structure illustrated in FIG. 6C. The passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform. The combination of the first dielectric etch stop layer 66A and the second etch stop layer 66B provides an increased amount of etch stop materials at a periphery of the opening 69 in the passivation dielectric layer 70. Typically, the peripheral portion of the opening 69 is a region in which overetch into the dielectric etch stop layers (66A, 66B) occurs, in embodiments in which the dielectric etch stop layers (66A, 66B) are etched through, the dielectric materials of the at least one dielectric material layer 60 may be etched to provide an etch profile that degrades optical coupling between the silicon grating structure 30 and the optical fiber 80. Thus, the presence of both of the first dielectric etch stop layer 66A and the second etch stop layer 66B at the periphery of the opening 69 in the passivation dielectric layer 70 reduces the probability of an etch-through of the at least one dielectric etch stop layer 66, and thus, reduces the probability of formation of an optically deleterious etch profile for the opening 69 in the passivation dielectric layer 70.

Figure 6D:
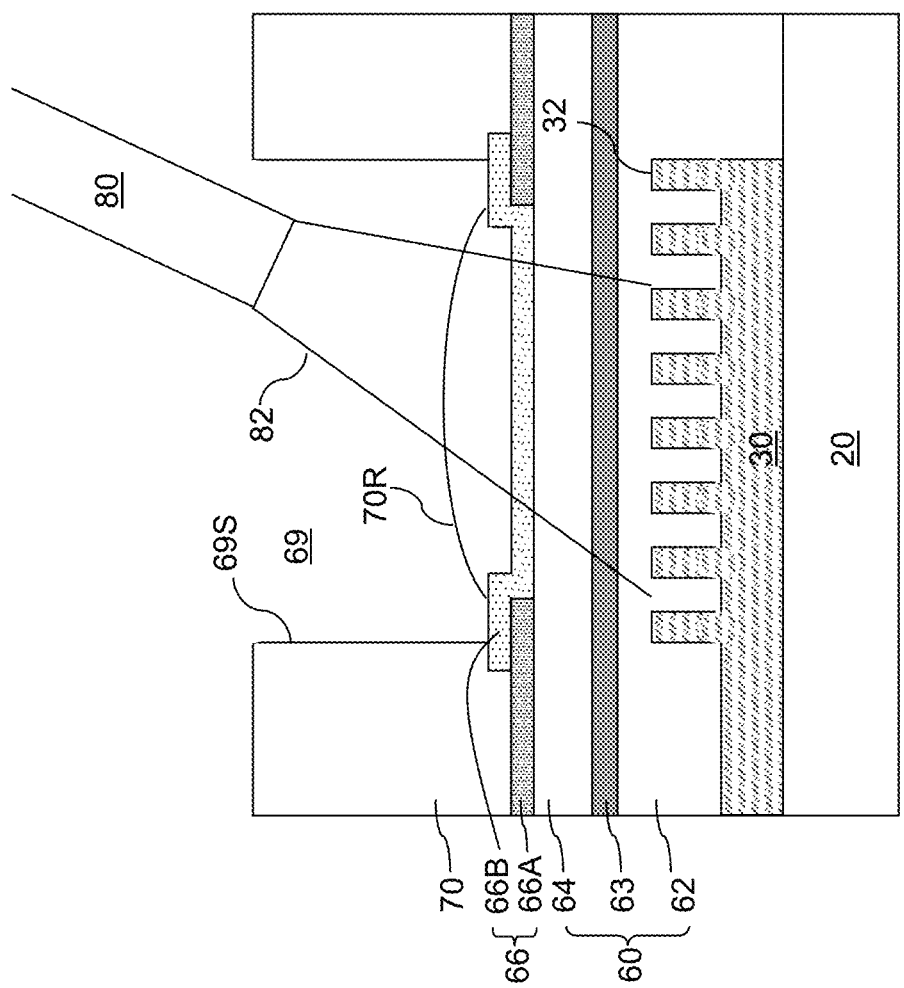
FIG. 6D is a vertical cross-sectional view of an alternative embodiment of the fifth configuration of the exemplary optical structure after attaching the optical fiber according to an embodiment of the present disclosure.

FIG. 6D is a vertical cross-sectional view of an alternative embodiment of the fifth configuration of the exemplary optical structure after removal of the patterned etch mask layer 77 and attaching the optical fiber 80 according to an embodiment of the present disclosure. A dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 6E:
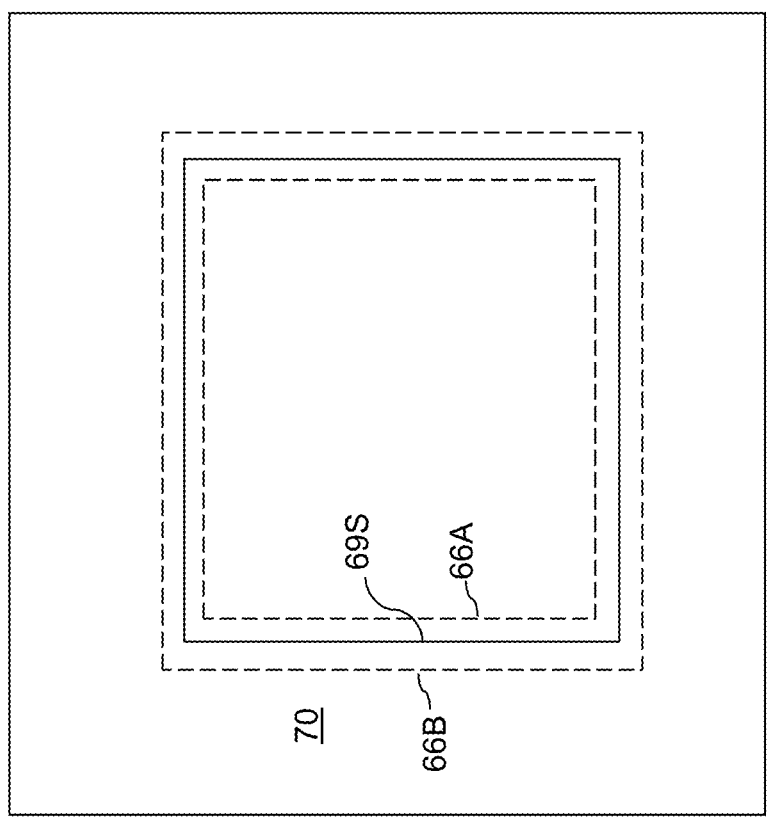
FIG. 6E is a plan view of the fifth configuration of the exemplary optical structure according to an embodiment of the present disclosure.

FIG. 6E is a plan view of the fifth configuration of the exemplary optical structure of FIG. 6C or FIG. 6D according to an embodiment of the present disclosure. The first dielectric etch stop layer 66A includes an opening having a periphery that is located within an area defined by sidewalls 69S of the opening 69 in the passivation dielectric layer 70, and the second dielectric etch stop layer 66B has a periphery that is located outside the area defined by sidewalls 69S of the opening 69 in the passivation dielectric layer 70, and does not include any opening within the periphery of the second dielectric etch stop layer 66B.

Figure 7A:
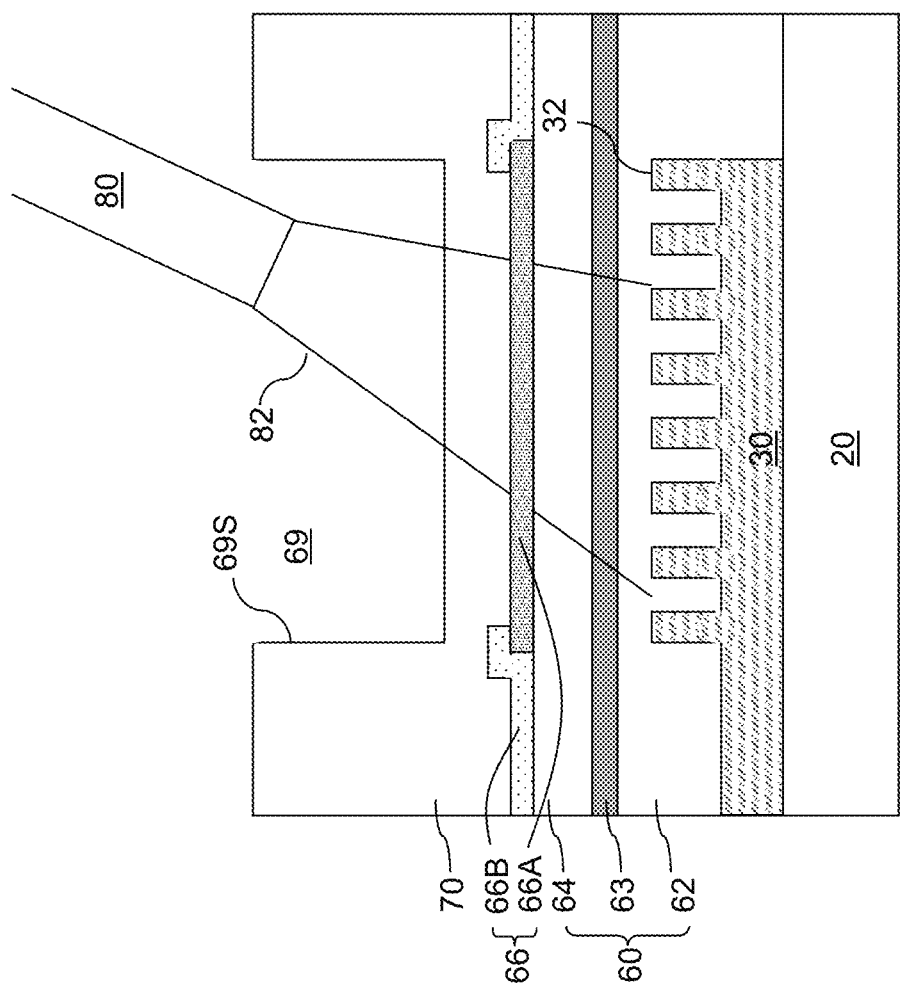
FIG. 7A is a vertical cross-sectional view of the sixth configuration of the exemplary optical structure after formation of an opening through the passivation dielectric layer according to an embodiment of the present disclosure.

FIG. 7A is a vertical cross-sectional view of the sixth configuration of the exemplary optical structure after formation of an opening 69 through the passivation dielectric layer 70 according to an embodiment of the present disclosure. The sixth configuration of the exemplary optical structure may be derived from the second exemplary optical structure by patterning the first dielectric etch stop layer 66A and the second dielectric etch stop layer 66B. Specifically, the first dielectric etch stop layer 66A may be patterned to cover the entire area of the opening 69 in the passivation dielectric layer 70 to be subsequently formed. In this embodiment, the first dielectric etch stop layer 66A may have a periphery that is located outside the periphery of the opening 69 in the passivation dielectric layer 70, and does not include any opening within the periphery of the first dielectric etch stop layer 66A. The second dielectric etch stop layer 66B may be patterned to form an opening within the area of the opening 69 in the passivation dielectric layer 70. The second dielectric etch stop layer 66B may include an opening having a periphery that is located within the area of the opening 69 in the passivation dielectric layer 70.

Subsequently, the processing steps of FIGS. 2B, 2C, and 2D may be performed to provide the structure illustrated in FIG. 7A. The passivation dielectric layer 70 continuously extends in the opening 69 and has a thickness in a range from 1 nm to 200 nm within the opening 69. The thickness of the portion of the passivation dielectric layer 70 within the opening 69 may, or may not, be uniform. The combination of the first dielectric etch stop layer 66A and the second etch stop layer 66B provides an increased amount of etch stop materials at a periphery of the opening 69 in the passivation dielectric layer 70. Typically, the peripheral portion of the opening 69 is a region in which overetch into the dielectric etch stop layers (66A, 66B) occurs, in embodiments in which the dielectric etch stop layers (66A, 66B) are etched through, the dielectric materials of the at least one dielectric material layer 60 may be etched to provide an etch profile that degrades optical coupling between the silicon grating structure 30 and the optical fiber 80. Thus, the presence of both of the first dielectric etch stop layer 66A and the second etch stop layer 66B at the periphery of the opening 69 in the passivation dielectric layer 70 reduces the probability of an etch-through of the at least one dielectric material layer 60, and thus, reduces the probability of formation of an optically deleterious etch profile for the opening 69 in the passivation dielectric layer 70.

Figure 7B:
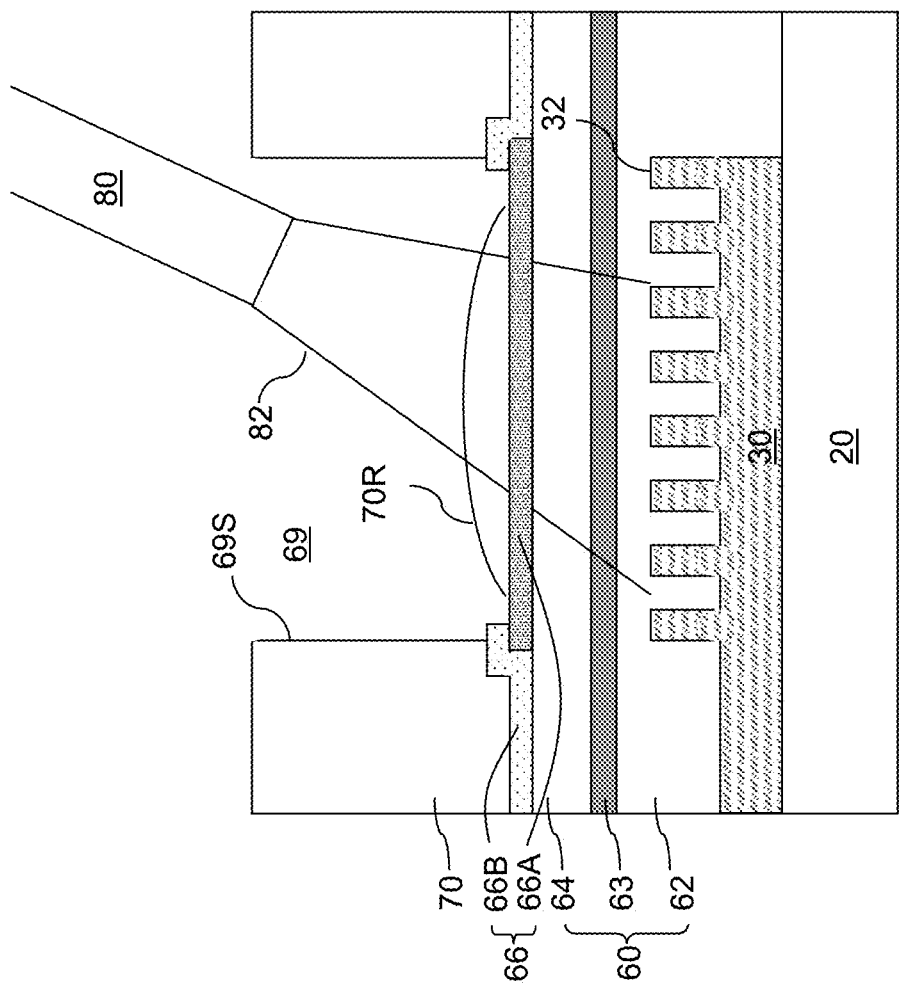
FIG. 7B is a vertical cross-sectional view of an alternative embodiment of the sixth configuration of the exemplary optical structure after attaching the optical fiber according to an embodiment of the present disclosure.

FIG. 7B is a vertical cross-sectional view of an alternative embodiment of the sixth configuration of the exemplary optical structure after removal of the patterned etch mask layer 77 and attaching the optical fiber 80 according to an embodiment of the present disclosure. A dielectric material portion 70R comprising the dielectric material of the passivation dielectric layer 70 is located at a center region of the opening 69 on a top surface of the single dielectric etch stop layer 66 and is laterally spaced from, and does not contact, sidewalls of the opening in the passivation dielectric layer 70. Thus, a discrete portion of the dielectric material that is not physically connected to the passivation dielectric layer 70 may be formed at a center portion of the opening 69. The discrete portion of the dielectric material may have a variable thickness that may be in a range from 1 nm to 200 nm. The dielectric material portion 70R in the opening 69 may have the same material composition as a planar portion of the passivation dielectric layer 70 having a uniform thickness (which is the initial thickness).

Figure 7C:
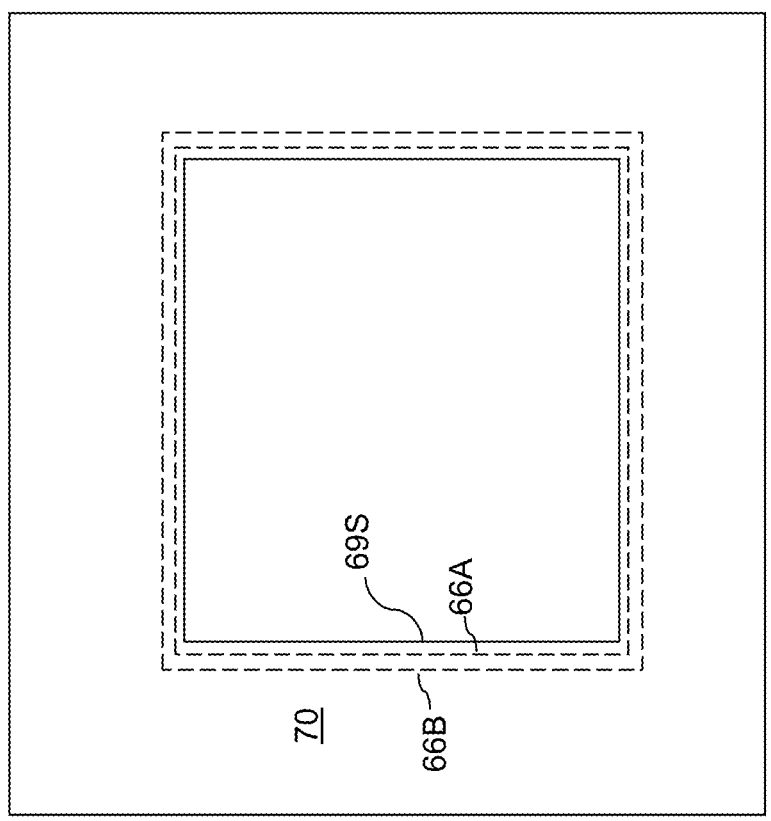
FIG. 7C is a plan view of the sixth configuration of the exemplary optical structure according to an embodiment of the present disclosure.

FIG. 7C is a plan view of the sixth configuration of the exemplary optical structure of FIG. 7A or 7B according to an embodiment of the present disclosure. The first dielectric etch stop layer 66A has a periphery that is located outside an area defined by sidewalls of the opening 69 in the passivation dielectric layer 70, and does not include any opening within the periphery of the first dielectric etch stop layer 66A, and the second dielectric etch stop layer 66B includes an opening having a periphery that is located within the area defined by sidewalls of the opening 69 in the passivation dielectric layer 70.

FIG. 8 is a vertical cross-sectional view of an exemplary semiconductor die 100 of the present disclosure after attaching optical fibers 80 according to an embodiment of the present disclosure. The semiconductor die 100 may incorporate the exemplary optical structure of FIG. 1. An optical molding structure 84 may be used to attach the optical fibers 80 to the semiconductor die 100, which is an optical semiconductor die including at least one silicon photonics device 50 and at least one silicon grating structure 30 therein. An array of solder balls 150 may be used to attach the semiconductor die 100 to a packaging substrate 200, which may include pins 250 for attachment to a circuit board, or may use another array of solder balls (such as C4 balls) for attachment to a circuit board.

Referring collectively to FIGS. 1-8 and according to various embodiments of the present disclosure, a semiconductor structure comprising a semiconductor die 100 and an optical fiber 80 is provided. The semiconductor die 100 comprises, from bottom to top, a silicon substrate 10, a buried insulating layer 20, a silicon grating structure 30, at least one dielectric material layer 60, at least one dielectric etch stop layer 66, and a passivation dielectric layer 70 comprising a dielectric material and including an opening 69 overlying an end portion of the silicon grating structure 30. The optical fiber 80 overlies the opening 69 in the passivation dielectric layer 70 and is optically coupled to the silicon grating structure 30 through the opening 69 in the passivation dielectric layer 70 and is attached to the semiconductor die 100 by an optical molding structure 84. The at least one dielectric material layer 60 comprises at least one dielectric material selected from silicon nitride and silicon oxynitride.

In one embodiment, the silicon grating structure 30 comprises a one-dimensional periodic array of silicon line structures 32 adjoined to a top surface of a silicon plate, wherein a distal end of the silicon plate is tapered to provide a variable width that decreases with a lateral distance from the one-dimensional periodic array of silicon line structures 32.

In one embodiment, the at least one dielectric etch stop layer 66 comprises a layer stack of a first dielectric etch stop layer 66A and a second dielectric etch stop layer 66B that overlies at least a portion of the first dielectric etch stop layer 66A and including a different dielectric material than the first dielectric etch stop layer 66A.

Figure 9:
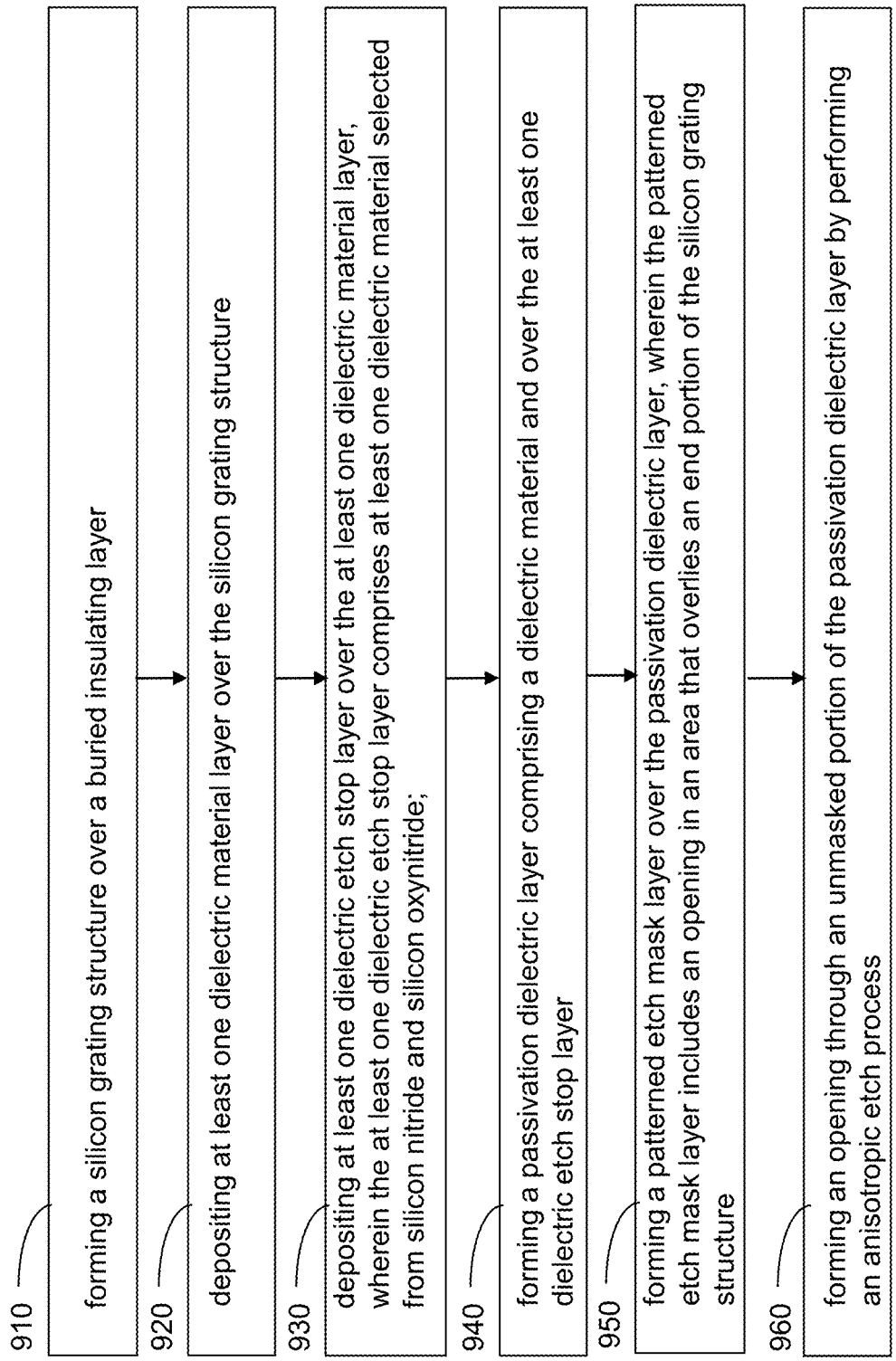
FIG. 9 is a flowchart illustrating steps for forming a silicon photonics device according to an embodiment of the present disclosure.

FIG. 9 is a flowchart illustrating steps for forming an optical structure according to an embodiment of the present disclosure. Referring to step 910 and FIG. 1, a silicon grating structure 30 may be formed over a buried insulating layer 20. Referring to step 920 and FIGS. 1, 2A, 2E, 3A, 3B, 4A, 4B, 5A, 5B, 6A, 6D, 7A, and 7B, at least one dielectric material layer 60 may be deposited over the silicon grating structure 30. Referring to step 930 and FIGS. 1, 2A, 2E, 3A, 3B, 4A, 4B, 5A, 5B, 6A, 6B, 6D, 7A, and 7B, at least one dielectric etch stop layer 66 may be deposited over the at least one dielectric material layer 60. The at least one dielectric etch stop layer 66 comprises at least one dielectric material selected from silicon nitride and silicon oxynitride. Referring to step 940 and FIGS. 1, 2A, 2E, 3A, 3B, 4A, 4B, 5A, 5B, 6C, 6D, 7A, and 7B, a passivation dielectric layer 70 comprising a dielectric material may be formed over the at least one dielectric etch stop layer 66. Referring to step 950 and FIGS. 1, 2B, 2E, 3A, 3B, 4A, 4B, 5A, 5B, 6C, 6D, 7A, and 7B, a patterned etch mask layer 77 is formed over the passivation dielectric layer 70. The patterned etch mask layer 77 includes an opening in an area that overlies an end portion of the silicon grating structure 30. Referring to step 960 and FIGS. 1, 2C, 2E, 3A, 3B, 4A, 4B, 5A, 5B, 6C, 6D, 7A, and 7B, an opening 69 may be formed through an unmasked portion of the passivation dielectric layer 70 by performing an anisotropic etch process that etches the dielectric material selective to a silicon nitride or silicon oxynitride using the patterned etch mask layer 77 as a masking structure. The patterned etch mask layer 77 may be subsequently removed, and an optical fiber 80 may be disposed over the opening 69 in the passivation dielectric layer 70.

The at least one dielectric etch stop layer 66 of the present disclosure includes a silicon nitride layer or a silicon oxynitride layer, which may be advantageously used as an effective etch stop layer during the anisotropic etch process that forms the opening 69 thorough the passivation dielectric layer 70. An ideal etch profile for the opening 69 is one in which the opening 69 does not vertically extend through the etch stop dielectric layer 66 and the at least one dielectric material layer 60 is not etched. The etch stop dielectric layer 66 prevents extension of the opening into the at least one dielectric material layer 60 by employing a different dielectric material than the dielectric material of the passivation dielectric layer 70. The chemistry of the anisotropic etch process may be selected such that the etch rate of the material(s) of the etch stop dielectric layer 66 is less than 30% and preferably less than 10%, and even more preferably less than 3%, of the etch rate of the dielectric material of the passivation dielectric layer 70 during the anisotropic etch process. In some embodiments, the etch resistance of the at least one dielectric etch stop layer 66 may be increased only around the periphery of the opening 69 in the passivation dielectric layer 70 while providing only one of the first dielectric etch stop layer 66A and the second dielectric etch stop layer 66B at a center region of the opening 69 through the passivation dielectric layer 70 by patterning one, or both, of the first dielectric etch stop layer 66A and the second dielectric etch stop layer 66B. In this embodiment, presence of only one of the first dielectric etch stop layer 66A and the second dielectric etch stop layer 66B at the center region of the opening 69 through the passivation dielectric layer 70 may reduce optical effects of the at least one dielectric etch stop layer (66A, 66B) by reducing the thickness of the at least one dielectric etch stop layer (66A, 66B) at the center region of the opening 69 through the passivation dielectric layer 70.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical structure comprising:
   a silicon grating structure located over a buried insulating layer;
   at least one dielectric material layer overlying, and contacting, the silicon grating structure;
   a layer stack of a first dielectric etch stop layer and a second dielectric etch stop layer, the layer stack overlying the at least one dielectric material layer, wherein each of the first dielectric etch stop layer and the second dielectric etch stop layer comprises a respective dielectric material selected from silicon nitride and silicon oxynitride, and the second dielectric etch stop layer includes a different dielectric material than the first dielectric etch stop layer;
   a passivation dielectric layer comprising a dielectric material and overlying the layer stack and including an opening overlying an end portion of the silicon grating structure, wherein the opening is free of the dielectric material of the passivation dielectric layer or comprises the dielectric material of the passivation dielectric layer at a thickness less than 10% of a thickness of the passivation dielectric layer outside the opening; and
   an optical fiber overlying the opening in the passivation dielectric layer and comprising an end surface for receiving or emitting light that is directed at the opening in the passivation dielectric layer, wherein:
   the layer stack is spaced from the opening by a portion of the passivation dielectric layer and is not exposed to the opening; or
   either the first dielectric etch stop layer or the second dielectric etch stop layer is exposed to the opening and another of the first dielectric etch stop layer and the second dielectric etch stop layer is not exposed to the opening.

2. The optical structure of claim 1, wherein:
   the first dielectric etch stop layer comprises a silicon carbide layer; and
   the second dielectric etch stop layer comprises silicon nitride or silicon oxynitride.

3. The optical structure of claim 1, wherein each of the first dielectric etch stop layer and the second dielectric etch stop layer continuously extends over an entire area of the silicon grating structure.

4. The optical structure of claim 1, wherein:
   the first dielectric etch stop layer continuously extends over an entire area of the silicon grating structure; and
   the second dielectric etch stop layer comprises a periphery that laterally surrounds an area defined by sidewalls of the opening in the passivation dielectric layer, wherein at least one segment of the periphery straddles the silicon grating structure.

5. The optical structure of claim 1, wherein:
   the first dielectric etch stop layer comprises a periphery that laterally surrounds an area defined by sidewalls of the opening in the passivation dielectric layer, wherein at least one segment of the periphery straddles the silicon grating structure; and
   the second dielectric etch stop layer continuously extends over an entire area of the silicon grating structure.

6. The optical structure of claim 1, wherein:
   the first dielectric etch stop layer includes an opening having a periphery that is located within an area defined by sidewalls of the opening in the passivation dielectric layer; and
   the second dielectric etch stop layer has a periphery that is located outside the area defined by sidewalls of the opening in the passivation dielectric layer, and does not include any opening within the periphery of the second dielectric etch stop layer.

7. The optical structure of claim 1, wherein:
   the first dielectric etch stop layer has a periphery that is located outside an area defined by sidewalls of the opening in the passivation dielectric layer, and does not include any opening within the periphery of the first dielectric etch stop layer; and
   the second dielectric etch stop layer includes an opening having a periphery that is located within the area defined by sidewalls of the opening in the passivation dielectric layer.

8. The optical structure of claim 1, wherein the at least one dielectric material layer comprises:

a first silicon oxide layer contacting the silicon grating structure;
a contact etch stop liner overlying the first silicon oxide layer; and
a second silicon oxide layer contacting the contact etch stop liner.

9. The optical structure of claim 1, wherein a dielectric material portion comprising the dielectric material of the passivation dielectric layer is located at a center region of the opening on a top surface of the layer stack and is laterally spaced from, and does not contact, sidewalls of the opening in the passivation dielectric layer.

10. The optical structure of claim 1, wherein the passivation dielectric layer continuously extends in the opening and has a thickness in a range from 1 nm to 200 nm, and has a thickness in a range from 3 microns to 30 microns outside the opening in the passivation dielectric layer.

11. A semiconductor structure comprising a semiconductor die and an optical fiber, wherein:
the semiconductor die comprises, from bottom to top, a silicon substrate, a buried insulating layer, a silicon grating structure, at least one dielectric material layer, a layer stack of a first dielectric etch stop layer and a second dielectric etch stop layer, and a passivation dielectric layer comprising a dielectric material and including an opening overlying an end portion of the silicon grating structure;
the optical fiber overlies the opening in the passivation dielectric layer and is optically coupled to the silicon grating structure through the opening in the passivation dielectric layer and is attached to the semiconductor die by an optical molding structure; and
the at least one dielectric material layer comprises at least one dielectric material selected from silicon nitride and silicon oxynitride, wherein:
each of the first dielectric etch stop layer and the second dielectric etch stop layer comprises a respective dielectric material selected from silicon nitride and silicon oxynitride;
the second dielectric etch stop layer includes a different dielectric material than the first dielectric etch stop layer;
each of the first dielectric etch stop layer and a second dielectric etch stop layer is located entirely underneath a bottom surface of the opening; and
one of the first dielectric etch stop layer and the second dielectric etch stop layer is vertically spaced from, and is not exposed to, the opening.

12. The semiconductor structure of claim 11, wherein the silicon grating structure comprises a one-dimensional periodic array of silicon line structures adjoined to a top surface of a silicon plate, wherein a distal end of the silicon plate is tapered to provide a variable width that decreases with a lateral distance from the one-dimensional periodic array of silicon line structures.

13. A method of forming an optical structure, comprising:
forming a silicon grating structure over a buried insulating layer;
depositing at least one dielectric material layer over the silicon grating structure;
depositing a layer stack of a first dielectric etch stop layer and a second dielectric etch stop layer over the at least one dielectric material layer, wherein each of the first dielectric etch stop layer and the second dielectric etch stop layer comprises a respective dielectric material selected from silicon nitride and silicon oxynitride, and the second dielectric etch stop layer includes a different dielectric material than the first dielectric etch stop layer;
forming a passivation dielectric layer comprising a dielectric material over the at least one dielectric etch stop layer;
forming a patterned etch mask layer over the passivation dielectric layer, wherein the patterned etch mask layer includes an opening in an area that overlies an end portion of the silicon grating structure; and
forming an opening through an unmasked portion of the passivation dielectric layer by performing an anisotropic etch process that etches the dielectric material selective to a silicon nitride or silicon oxynitride using the patterned etch mask layer as a masking structure, wherein:
the layer stack is spaced from the opening by a portion of the passivation dielectric layer and is not exposed to the opening; or
either the first dielectric etch stop layer or the second dielectric etch stop layer is exposed to the opening and another of the first dielectric etch stop layer and the second dielectric etch stop layer is not exposed to the opening.

14. The method of claim 13, wherein:
the passivation dielectric layer has a passivation dielectric layer thickness prior to the anisotropic etch process; and
a duration of the anisotropic etch process is selected such that the opening is free of the dielectric material of the passivation dielectric layer or comprises the dielectric material of the passivation dielectric layer at a thickness less than 10% of the passivation dielectric layer thickness.

15. The method of claim 13, further comprising disposing an optical fiber over the opening in the passivation dielectric layer, wherein the optical fiber comprises an end surface for receiving or emitting light that is directed at the opening in the passivation dielectric layer.

16. The method of claim 13, wherein:
the first dielectric etch stop layer comprises a silicon carbide layer; and
the second dielectric etch stop layer comprises silicon nitride or silicon oxynitride.

17. The optical structure of claim 1, wherein:
a first one of the first dielectric etch stop layer and the second dielectric etch stop layer has a first periphery such that an entirety of the first one of the first dielectric etch stop layer and the second dielectric etch stop layer is located within an area enclosed by the first periphery;
a second one of the first dielectric etch stop layer and the second dielectric etch stop layer comprises a portion located outside the area enclosed by the first periphery.

18. The optical structure of claim 17, wherein:
the second one of the first dielectric etch stop layer and the second dielectric etch stop layer has an opening having a second periphery;
an entirety of the second one of the first dielectric etch stop layer and the second dielectric etch stop layer is located outside an area enclosed by the second periphery.

19. The optical structure of claim 18, wherein the second periphery is laterally offset outward from the first periphery.

20. The optical structure of claim 13, wherein:
a first one of the first dielectric etch stop layer and the second dielectric etch stop layer is formed entirely within an area defined by a first periphery; and a second one of the first dielectric etch stop layer and the second dielectric etch stop layer comprises a portion located outside the area enclosed by the first periphery.

\* \* \* \* \*